(12) United States Patent
Kawakami

(10) Patent No.: US 7,001,035 B2
(45) Date of Patent: Feb. 21, 2006

(54) ILLUMINATION DEVICE, LIQUID CRYSTAL DEVICE, AND ELECTRONIC APPARATUS

(75) Inventor: Hisanori Kawakami, Matsumoto (JP)

(73) Assignee: Seiko Epson Corporation (JP)

( * ) Notice: Subject to any disclaimer, the term of this patent is extended or adjusted under 35 U.S.C. 154(b) by 73 days.

(21) Appl. No.: 10/379,428

(22) Filed: Mar. 4, 2003

(65) Prior Publication Data

US 2003/0223218 A1 Dec. 4, 2003

(30) Foreign Application Priority Data

Mar. 5, 2002 (JP) ......................................... 2002-059561
Dec. 25, 2002 (JP) ......................................... 2002-375561

(51) Int. Cl.
*F21V 8/00* (2006.01)

(52) U.S. Cl. .............................. 362/31; 362/561; 362/84
(58) Field of Classification Search ................... 362/31, 362/26, 561, 84
See application file for complete search history.

(56) References Cited

U.S. PATENT DOCUMENTS

| | | | | | |
|---|---|---|---|---|---|
| 5,521,797 | A | * | 5/1996 | Kashima et al. | 362/31 |
| 6,065,846 | A | * | 5/2000 | Kato et al. | 362/30 |
| 6,147,725 | A | * | 11/2000 | Yuuki et al. | 349/65 |
| 6,601,962 | B1 | * | 8/2003 | Ehara et al. | 362/31 |
| 6,648,485 | B1 | * | 11/2003 | Colgan et al. | 362/31 |

FOREIGN PATENT DOCUMENTS

| | | | |
|---|---|---|---|
| JP | 04-63402 U | * | 5/1992 |
| JP | 09-145934 | | 6/1997 |
| JP | 10-199316 | | 7/1998 |
| JP | 10-199318 | * | 7/1998 |
| JP | 10-253957 | * | 9/1998 |
| JP | 10-260404 | | 9/1998 |
| JP | 10-293202 | | 11/1998 |
| JP | 030520 | * | 1/2000 |
| JP | 2000-057831 | | 2/2000 |
| JP | 2000-306411 | | 11/2000 |
| JP | 118416 | * | 4/2001 |
| JP | 135121 | * | 5/2001 |
| JP | 2001-236811 | | 8/2001 |
| JP | 2001-345006 | | 12/2001 |
| JP | 042534 | * | 2/2002 |
| JP | 2002-196151 | | 7/2002 |

OTHER PUBLICATIONS

Communication from Chinese Patent Office re: counterpart application.
Communication from Chinese Patent Office re: counterpart application.
Communication from Japanese Patent Office re: counterpart application.*

* cited by examiner

*Primary Examiner*—Laura K. Tso
(74) *Attorney, Agent, or Firm*—Harness, Dickey & Pierce, P.L.C.

(57) ABSTRACT

An illumination device is provided to solve locally high luminance near point-shaped light sources, while preventing overall decrease in luminance at the light-emitting face of a light guide member. The illumination device includes a light source for generating light, and a light guide member which receives light from the light source at a light input face and emits light from a light emitting face. A continuous optical pattern with prism faces and flat faces is provided on the light input face. Light emitted from the light source is diffused in the plane direction by the optical pattern, so there is no occurrence of locally-high-luminance areas near the LEDs in the light guide member. Moreover, the luminance of the light emitted in a planar manner from the light-emitting face does not decrease.

24 Claims, 15 Drawing Sheets

| FORM OF LIGHT INPUT FACE | AVERAGE LUMINANCE (cd/m²) | UNIFORMITY (%) | LOCALLY-HIGH-LUMINANCE AREAS |
|---|---|---|---|
| FLAT FACES ALONE | 1740 | 79 | × |
| PRISMS + FLAT FACES | 1760 | 81 | ○ |
| CONTINUOUS PRISMS | 1360 | 85 | ◎ |

× : EXTREMELY CONSPICUOUS

○ : POSES NO PROBLEMS FROM A PRACTICAL STANDPOINT

◎ : HARDLY CONSPICUOUS

ILLUMINATION DEVICE, LIQUID CRYSTAL DEVICE, AND ELECTRONIC APPARATUS

BACKGROUND OF THE INVENTION

1. Technical Field of the Invention

The present invention relates to an illumination device for generating light, a liquid crystal device configured using the illumination device, and an electronic apparatus configured using the liquid crystal device.

2. Description of the Related Art

Currently, liquid crystal devices are widely used in cellular phones, portable information terminals, digital cameras, video camcorders, and other such electronic equipment. In many cases, the liquid crystal devices are used as display units for displaying images such as characters, numbers, shapes, and so forth.

Generally, with liquid crystal devices, the orientation of liquid crystal molecules within the liquid crystal layer is controlled for each display dot by controlling the voltage applied to the liquid crystal for each display dot.

The light passing through the liquid crystal layer is modulated by the orientation control of the liquid crystal molecules, thus displaying images such as characters or the like.

Note that display dots are a great number of the smallest display unit making up the effective display area of a liquid crystal panel, and in the event of performing full-color display by mixing the three primary colors of red (R), green (G), and blue (B), for example, one display unit for each color is a display dot, and the display dots of the three colors collectively form one pixel. Also, in the event of monochrome display, one display unit is a display dot, and the display dot itself makes up one pixel.

There are two types of the above-described liquid crystal device, reflective liquid crystal devices and transmissive liquid crystal devices, depending on how light is supplied to the liquid crystal layer. Reflective liquid crystal devices supply external light such as sunlight or room light or the like to the liquid crystal layer by reflecting the light behind the liquid crystal layer.

Transmissive liquid crystal devices have an illumination device disposed behind the liquid crystal layer, and supply light generated at the illumination device to the liquid crystal layer. Also, currently, so-called transflective liquid crystal devices are known, which use both the reflective display method and the transmissive display method.

An example of a conventional illumination device is an illumination device shown in FIG. 11(a), comprising one or multiple point-shaped light sources 152 facing the light input face 151a of a light guide plate 151, which has a plate shape with the plate thickness direction in the vertical direction of the drawing. With this illumination device, the light emitted in point fashion from the light sources 152 passes through the light input face 151a and is guided into the light guide plate 151, and then emitted in plane form from the light emitting face 151b of the light guide member 151 (see Japanese Laid-Open Patent Application Publication No. Hei10-260404 (Page 3, FIG. 1), for example).

However, with this conventional illumination device, there have been cases wherein the luminance of the areas A near the individual light sources 152 of the light guide member 151 is locally high, so that the areas A are recognized by an observer to be excessively bright. In the present specification, areas where the luminance becomes locally high will be referred to as locally-high-luminance areas. Normally, the areas A often have a shape close to that of a circle, and accordingly, the areas A are sometimes called eye forming areas.

In order to prevent such locally-high-luminance areas A from occurring, conventional arrangements are known wherein arc-shaped notches 153, which are so-called R shapes, are provided on the light input face 151a of the light guide member 151 facing each light source 152, as shown in FIG. 11(b). As shown in FIG. 12(c), a configuration is also known for the light guide member 151 wherein the distance L between the plane-formed effective light-emitting area W and the light sources 152 is set so as to be long, so that the locally-high-luminance areas A are not conspicuous within the effective light emitting area W. Further, as shown in FIG. 12(d), providing a diffusing sheet 154 with a high Haze value, i.e., a high degree of light diffusion, to the light emitting face 151b of the light guide member 151, is also known.

However, neither the configuration wherein arc-shaped notches 153 are provided on the light input face 151a of the light guide member 151 as shown in FIG. 11(b), the configuration wherein the distance L between the effective light emitting area W and the light sources 152 is set so as to be long as shown in FIG. 12(c), nor even the configuration wherein a diffusing sheet 154 is provided as shown in FIG. 12(d), enable the locally-high-luminance areas A to be completely eliminated.

The present invention has been made in view of the above problems, and it is one object thereof to solve the problem wherein the luminance becomes locally bright near the point-shaped light sources with regard to the light emitted from point-shaped light sources.

SUMMARY OF THE INVENTION (1) To achieve the above object, an illumination device according to the present invention comprises: a light source for generating light; and a light guide member wherein light from the light source is received at a light input face and emitted from a light emitting face, wherein the light input face has formed thereupon an optical pattern of continuous prism faces and flat faces.

According to this illumination device, the light input face is neither a simple flat face nor a simple continuation of prism faces, but rather a face of continuous prism faces and flat faces, so light which has entered the light input face is sufficiently diffused, and particularly is sufficiently diffused in the planar direction of the light guide member. Accordingly, the occurrence of locally-high-luminance areas at parts of the light guide member near the light sources can be prevented in a reliable manner.

Also, while a continuation of prism faces alone may lead to a reduction in the luminance of light emitted from the light guide member and the display screen becoming dark, a continuation of prism faces and flat faces prevents deterioration in luminance and realizes a bright display.

(2) With the illumination device configured as described above, the prism faces may be formed to linearly extend in the thickness direction of the light guide, i.e., in the orthogonal directions against the planar directions, with the cross-sectional form thereof being triangular protrusions or recesses. Thus, light entering the light input face of the light guide member can be sufficiently diffused in the planar direction of the light guide member.

(3) With the illumination device configured as described above, the prism faces may be formed to linearly extend in the thickness direction of the light guide, i.e., in the orthogonal directions against the planar directions, with the cross-sectional form thereof being protrusions or recesses of a right triangle shape with the light input face as the base thereof. Thus, light entering the light input face of the light guide member can be sufficiently diffused in the planar direction of the light guide member.

(4) With the illumination device configured as described above, the prism faces may be formed to linearly extend in the thickness direction of the light guide, i.e., in the orthogonal directions against the planar directions, with the cross-sectional form thereof being protrusions or recesses of shapes with an isosceles triangle shape which is more acute than an equilateral triangle. Thus, light entering the light input face of the light guide member can be sufficiently diffused in the planar direction of the light guide member.

(5) With the illumination device configured as described above, the width of the prism faces is preferably generally equal over the entire area of the light guide member in the thickness direction of the light guide member. An arrangement wherein prism faces are not provided over the entire area of the light guide member in the thickness direction thereof but rather partially provided over the light guide member in the thickness direction might be conceived. Also, an arrangement wherein the width of the prism faces changes along the thickness direction of the light guide member might be conceived. However, in these cases, the effects of suppressing the occurrence of locally-high-luminance areas might be insufficient. Conversely, setting the width of the prism faces so as to be generally equal over the entire area of the light guide member in the thickness direction allows the occurrence of locally-high-luminance areas to be prevented in a reliable manner. Also, forming width of the prism faces so as to be equal over the entire area of the light guide member in the thickness direction makes manufacturing extremely easy.

(6) With the illumination device configured as described above, the height or depth of the prism faces is 10 to 50 $\mu$m, preferably 0.02 to 0.03 mm, the vertical angle of the prism faces is 80 to 120°, and the pitch of the prisms is preferably 100 to 300 $\mu$m. Thus, the occurrence of locally-high-luminance areas can be prevented in a reliable manner, and moreover, the luminance of the emitted light can be maintained at a high level.

(7) With the illumination device configured as described above, a plurality of dot patterns for adjusting the refractive index of light are preferably formed on the light emitting face of the light guide member and/or the reverse face thereof, wherein, of these dot patterns, the width of the dot patterns formed closest to the light input face is smaller than the length of the base of the prism faces. Thus, the degree of involvement of light entering the light guide member through the light input face and the occurrence of locally-high-luminance areas can be suppressed.

(8) With the illumination device configured as described above, a plurality of stripe patterns for adjusting the refractive index of light may be formed on the light emitting face of the light guide member and/or the reverse face thereof. According to experiments performed by the present inventor, forming prism faces on the light input face of a light guide member upon which stripe patterns have been formed is more effective in suppressing the occurrence of locally-high-luminance areas than forming prism faces on the light input face of a light guide member upon which dot patterns have been formed.

(9) Next, the illumination device according to the present invention comprises: a light source for generating light; a board for supporting the light source; and a light guide member wherein light from the light source is received at a light input face and emitted from a light emitting face, wherein an optical area for suppressing the luminance of a locally high-luminance area occurring near the light source is provided on the face of the board supporting the light source, and wherein the light input face has formed thereupon an optical pattern of continuous prism faces and flat faces.

According to this illumination device, optical patterns containing prism faces are formed on the light input face of the light guide member, and further an optical area is formed on the board at the light source side, so the occurrence of locally-high-luminance areas can be prevented in an even more reliable manner by the interactive effect of the optical pattern and optical area.

(10) With the illumination device configured as described above, the optical area may be formed by providing material which does not readily reflect light on the board near the light-emitting face of the light source. Thus, the occurrence of locally-high-luminance areas can be suppressed in a reliable manner.

(11) With the illumination device configured as described above, the optical area may be formed by providing material which does not readily reflect light on an area on the board where light from the light source reaches. Thus, the occurrence of locally-high-luminance areas can be suppressed in a reliable manner.

(12) With the illumination device configured as described above, the material which does not readily reflect light is preferably provided over a wider range than the optical directivity range of the light source. Generally, light emitted from a light source tends to head in a certain direction, i.e., directivity. Locally-high-luminance areas often occur corresponding to such optical directivity regions. Accordingly, providing the material which does not readily reflect light over a wider range than the optical directivity range of the light source allows the occurrence of locally-high-luminance areas to be suppressed in a reliable manner.

(13) With the illumination device configured as described above, a light reflective area is preferably provided on the surface of the board where the light source is provided, at the area surrounding the optical area. The optical area is provided at an area where a sufficiently great amount of light from the light source reaches, and functions to prevent a great amount of reflected light from occurring from this area. As can be understood from this, little light is supplied from the light source to the surrounding areas of the optical area on the board. Accordingly, a great difference in luminance might occur between the optical area where sufficient light reaches and the surrounding areas where sufficient light does not reach, unless some sort of measures are taken for the surrounding area. In this case, providing a light reflective area to the surrounding area enables the amount of light reflecting from around the optical area to be increased, so the difference in luminance can be suppressed.

(14) With the illumination device configured as described above, the light reflective area may be formed as a white color area. Also, this white color area may be formed by, for example, printing a white color on the board, applying a white color sticker on the board, and so forth.

(15) With the illumination device configured as described above, the material which does not readily reflect light may comprise light absorbing material, light diffusing material, or light transmitting material. In the event of using the light absorbing material, reflection of light can be suppressed by absorbing light from the light source. Also, in the event of using the light diffusing material, concentrated reflection of light in a particular direction can be suppressed by diffusing light from the light source. Also, in the event of using the light transmitting material, reflection of light can be suppressed by transmitting light from the light source.

(16) With the illumination device configured as described above, the material which does not readily reflect light may be formed by black or gray colored printing. Or, the material which does not readily reflect light may be formed by applying black color stickers or gray color stickers to the board.

(17) With the illumination device configured as described above, the light source may be formed by a blue LED (Light Emitting Diode) and a YAG fluorescent substance provided around the blue LED. This configuration is a common configuration of LEDs for emitting white light.

(18) Next, a liquid crystal device according to the present invention comprises: an illumination device which generates light in a planar manner; and a liquid crystal panel provided facing the light emitting face of the illumination device, wherein the illumination device is configured as described above. According to the illumination device used with this liquid crystal device, locally-high-luminance areas do not occur near the light sources, so display with a uniform brightness over the entire display area can be realized.

(19) Next, an electronic apparatus according to the present invention comprises: a liquid crystal device comprising a liquid crystal layer; a housing for storing the liquid crystal device; and a control means for controlling the operations of the liquid crystal device, wherein the liquid crystal device is configured as described above. According to the liquid crystal device used in this electronic apparatus, display with a uniform brightness over the entire display area can be realized without locally-high-luminance areas occurring, so an eye-friendly display can be realized for the information display unit of the electronic apparatus.

BRIEF DESCRIPTION OF THE DRAWINGS

FIG. 13 is a diagram illustrating an embodiment of the illumination device according to the present invention, wherein FIG. 13(a) is a plan view, and FIG. 13(b) is a side cross-sectional view.

FIG. 14 is a diagram illustrating an embodiment of the illumination device according to the present invention, wherein FIG. 14(a) is a side view, and FIG. 14(b) is a plan view.

FIG. 15 is a diagram illustrating the measurement results performed using the embodiment shown in FIG. 14.

DETAILED DESCRIPTION OF THE EMBODIMENTS

Embodiments of Illumination Device and Liquid Crystal Device

Figure 1:
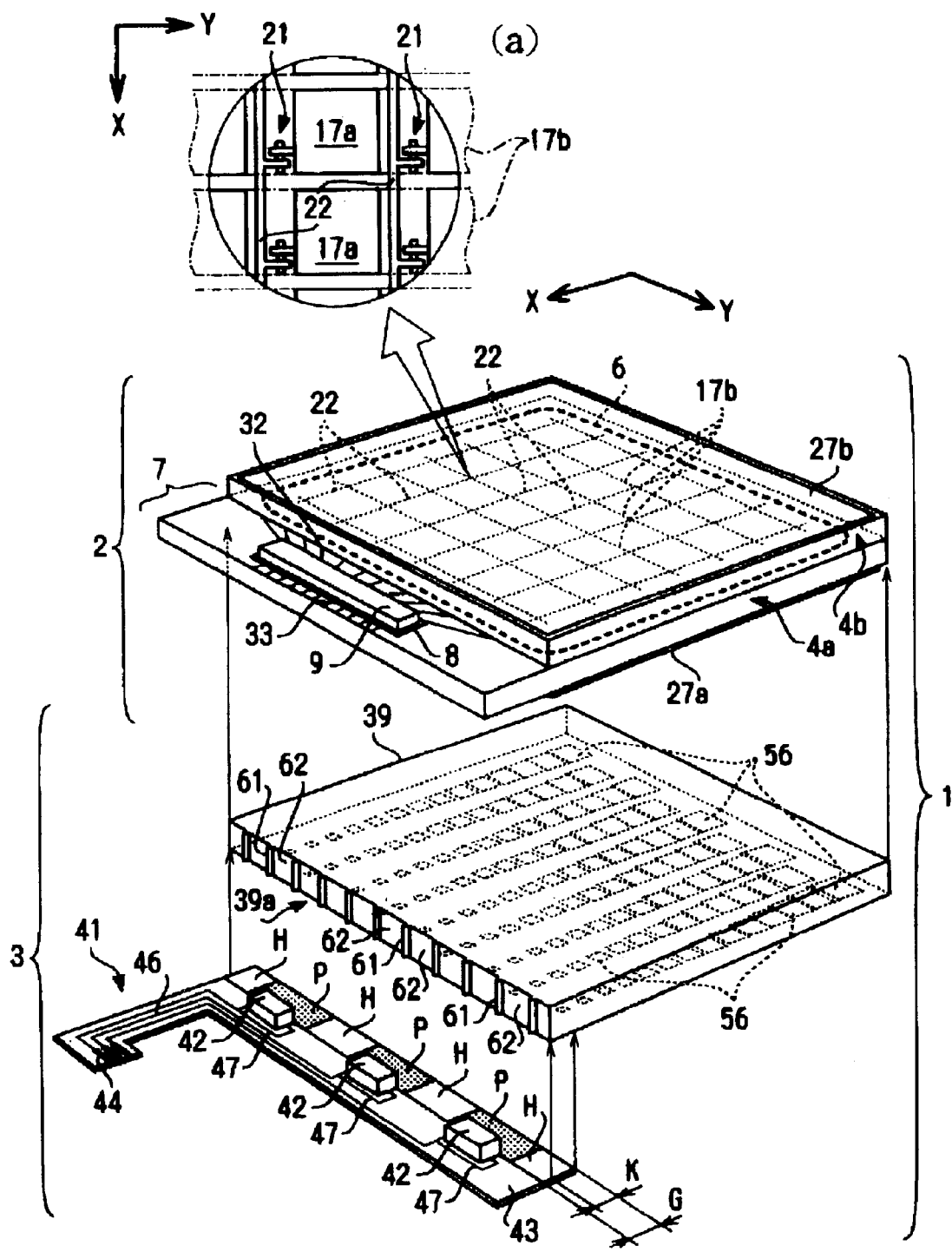
FIG. 1 is a perspective view illustrating an embodiment of the illumination device and liquid crystal device according to the present invention.

The following is a description of the illumination device and liquid crystal device according to the present invention, with embodiments as examples thereof. FIG. 1 is an embodiment wherein the present invention is applied to a liquid crystal device with a COG (Chip On Glass) structure, driving ICs are directly mounted on a board, which is an active matrix type using TFDs (Thin Film Diodes) which are two-terminal switching devices.

Figure 2:
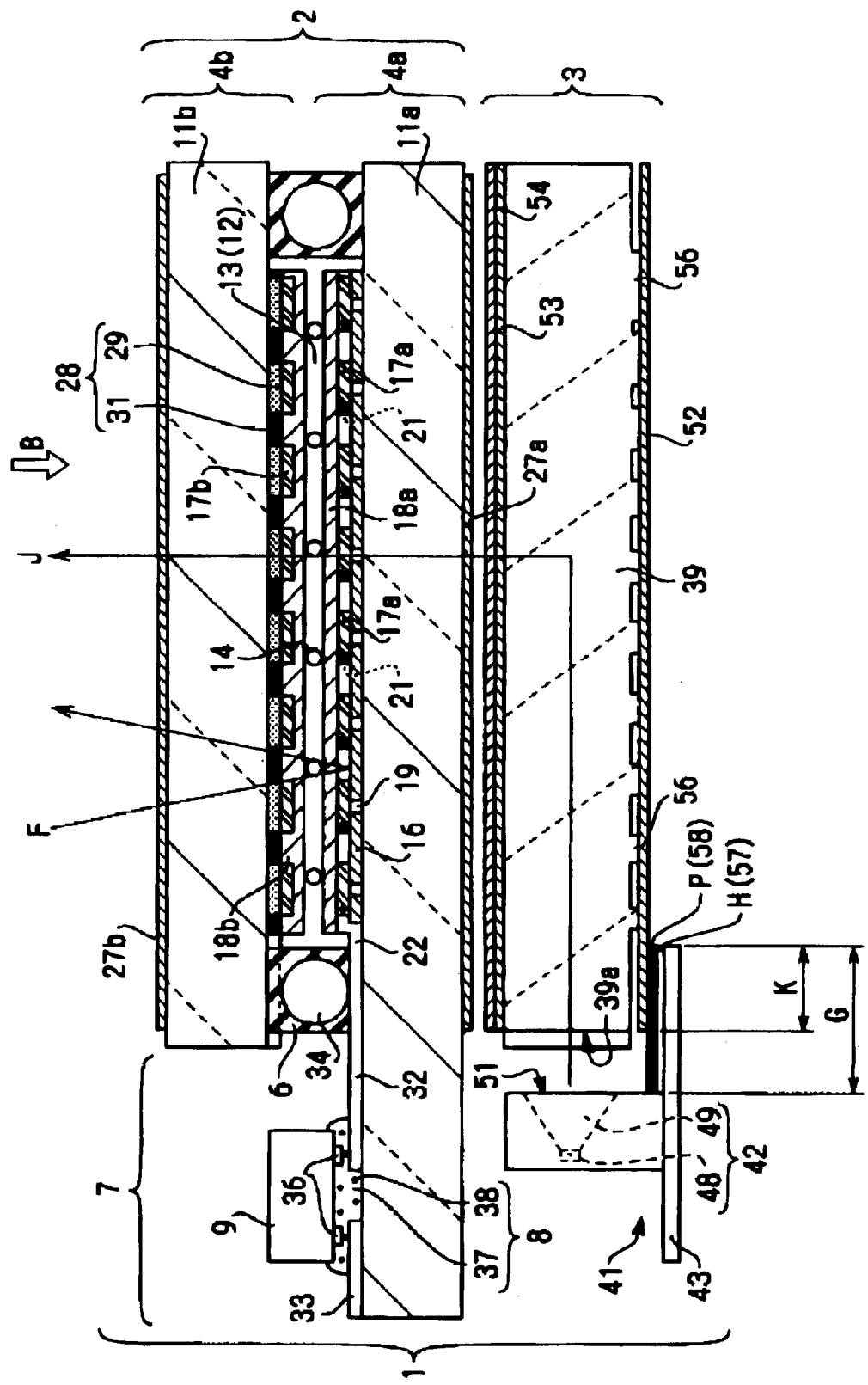
FIG. 2 is a cross-sectional view illustrating the cross-sectional configuration of the liquid crystal device shown in FIG. 1.

In FIG. 1, the liquid crystal device 1 is formed by assembling an illumination device 3 onto a liquid crystal panel 2. The liquid crystal panel 2 is formed by securing a first substrate 4a and second substrate 4b together with a ring-shaped seal member 6. As shown in FIG. 2, a so-called cell gap 12 which is a gap maintained by spacers 14 is formed between the first substrate 4a and the second substrate 4b, and liquid crystal is sealed in this cell gap 12 to form a liquid crystal layer 13.

In FIG. 2, the first substrate 4a has a first base material 11a formed of, for example, glass or plastic, among others, which is square as observed from the direction of the arrow B, with a transflector film 16 on the liquid crystal side surface of the first base material 11a having TFDs 21 and dot electrodes 17a formed thereupon and an alignment layer 18a formed thereabove. Before securing the pair of substrates 4a and 4b with the seal member 6, the surface of the alignment layer 18a is subjected to orientation processing such as a rubbing process or the like.

Also, a polarizing plate 27a is mounted on the outer surface of the first base material 11a by adhesion or the like, for example. The polarizing plate 27a functions to transmit linearly-polarized light facing one direction, and to not transmit other polarized light by absorbing, diffusing, or the like.

The transflector film 16 is formed by forming a reflective film out of a photoreflective material such as aluminum for example, by sputtering or the like, and then providing openings 19 for transmitting light at positions corresponding to the dot electrodes 17a by photo-etching, for example. Note that an arrangement may be used wherein the thickness of the reflective film is made to be thin instead of providing openings 19, so as to have both a function of reflecting light and a function of transmitting light.

TFDs 21 are formed between the dot electrodes 17a and line wiring 22, as shown in FIG. 1(a). As shown in FIG. 1, the line wiring 22 includes a plurality of wires extending in the X direction in a parallel array at predetermined intervals in the Y direction (i.e., the direction orthogonal to the X direction), thereby forming a striped form overall. Note that while FIG. 1 schematically shows the line wiring 22 with just a few lines and great intervals therebetween to facilitate understanding of the structure, in practice, the line wiring 22 has a great number of lines formed at extremely narrow intervals.

Figure 3:
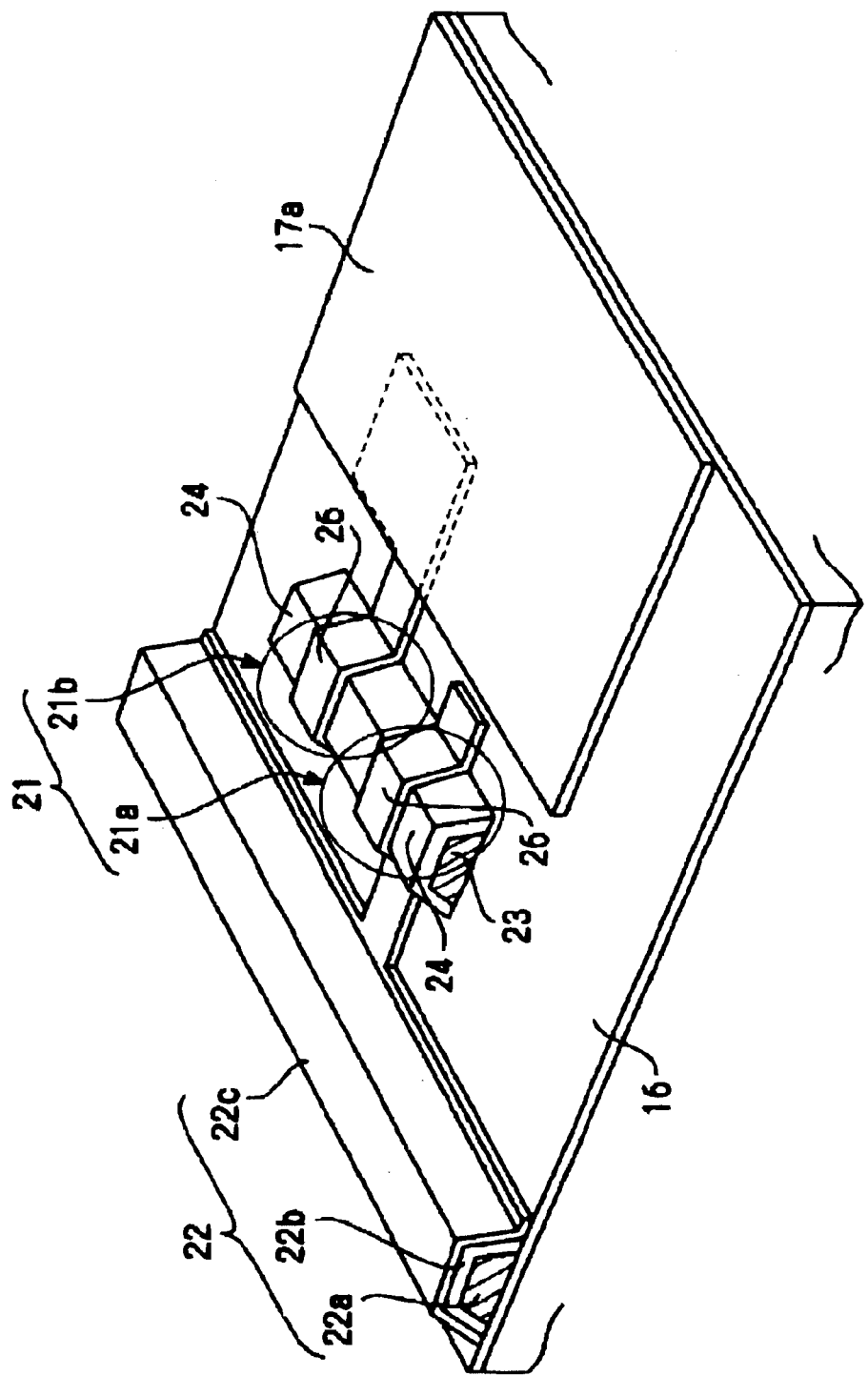
FIG. 3 is a perspective view illustrating an example of an active device used in the liquid crystal device shown in FIG. 1.

The individual TFDs 21 are formed by serially connecting a first TFD component 21a and a second TFD component 21b, as shown in FIG. 3. The TFD 21 is formed as follows, for example. First, a first layer 22a of the line wiring 22 and a first metal 23 of the TFD 21 are formed of TaW (tantalum tungsten). Next, anodic oxidation processing is performed to form a second layer 22b of the line wiring 22 and an insulating film 24 of the TFD 21. Next, a third layer 22c of the line wiring 22 and a second metal 26 of the TFD 21 are formed of Cr (chromium), for example.

The second metal 26 of the first TFD component 21a extends from the third layer 22c of the line wiring 22. Also, a dot electrode 17a is formed so as to overlap with the tip of the second metal 26 of the second TFD component 21b. Considering that electric signals flow from the line wiring 22 toward the dot electrode 17a, electric signals flow along the that current direction in the order of second electrode 26→ insulating film 24→ first metal 23 at the first TFD component 21a, while electric signals flow in the order of first metal 23→ insulating layer 24→ second metal 26 at the second TFD component 21b.

That is to say, one pair of TFD components which are electrically facing opposite one another are serially connected to each other between the first TFD component 21a and the second TFD component 21b. Such a structure is generally called a Back-to-Back structure, and TFDs with this structure are known to yield more stable characteristics than configuring TFDs with only one TFD component.

The dot electrode 17a formed overlapping the tip of the second TFD component 21b of the TFD 21 is formed by applying photolithography processing and etching processing to a metal oxide such as ITO (Indium Tin Oxide), for example. As shown in FIG. 1(a), multiple dot electrodes 17a are arrayed in a column form in the direction in which one line wiring 22 extends, i.e., in the X direction, and further, column-like dot electrodes 17a thereof are arrayed in parallel in the direction orthogonal to the line wiring 22, i.e., in the Y direction one next to another. Consequently, the multiple dot electrodes 17a are arrayed in matrix fashion within a plane defined by the X direction and Y direction.

Each multiple dot electrode 17a makes up one display dot, and a matrix array of the multiple display dots forms a display area for displaying images.

In FIG. 2, a second substrate 4b facing the first substrate 4a has a second base material 11b formed of, for example, glass or plastic, among others., which is square as observed from the direction of the arrow B. A color filter 28 is formed on the liquid crystal side of the second base material 11b, with line electrodes 17b formed thereupon, and an alignment layer 18b formed thereabove. Before securing the pair of substrates 4a and 4b with the seal member 6, the surface of the alignment layer 18b is subjected to orientation processing such as a rubbing process or the like.

Also, a polarizing plate 27b is mounted on the outer surface of the second base material 11b by adhesion or the like, for example. The polarizing plate 27b functions to transmit linearly-polarized light facing one direction which is different from the polarizing transmitting axis of the polarizing plate 27a on the side of the first substrate 4a, and to not transmit other polarized light by absorbing, diffusing, or the like.

As shown in FIG. 1 and FIG. 1(a), the line electrodes 17b extend in the direction orthogonal to the line wiring 22, i.e., in the Y direction, and are arrayed in parallel at predetermined intervals in the X direction orthogonal therewith, thereby forming a striped form overall. As shown in FIG. 1(a), each of the line electrodes 17b is formed facing the multiple dot electrodes 17a arrayed in a column form, in the Y direction. The overlapped area between the dot electrodes 17a and the line electrodes 17b makes up one display dot.

Note that while FIG. 1 schematically shows just a few line electrodes 17b and great intervals therebetween to facilitate understanding of the structure, in practice, a great number of line electrodes 17b are formed at extremely narrow intervals.

In FIG. 2, the color filter 28 is configured of R, G, and B tricolor picture elements 29 arranged in a predetermined array, and light shielding areas formed between the picture elements 29, i.e., a black mask 31. Examples of the array for the R, G, and B color picture elements 29 include stripe arrays, delta arrays, mosaic arrays, and so forth. Also, each of the color picture elements 29 is formed at a position corresponding to the display dots formed so that the dot electrodes 17a and the line electrodes 17b overlap.

In FIG. 1, the first substrate 4a has an extending portion 7 which extends outward relative to the second substrate 4b, with wiring 32 and terminals 33 being formed on the surface of the extending portion 7. A driving IC 9 is mounted at the area where the wiring 32 and terminals 33 are gathered, by an ACF (Anisotropic Conductive Film) 8. As shown in FIG. 2, the driving IC 9 has bumps 36 which are protruding terminals. Also, the ACF 8 is formed by mixing a great amount of minute electroconductive particles 38 in a resin 37 having hardening characteristics such as thermosetting, thermoplasticity, ultraviolet curing, or the like. The bumps 36 on the output side of the driving IC 9 are electroconductive connected with the wiring 32 formed on the extending portion 7 of the first substrate 4a by the electroconductive particles 38 within the ACF 8. Also, the bumps 36 on the input side of the driving IC 9 are electroconductive connected with the terminals 33 by the electroconductive particles 38.

In FIG. 2, the wiring 32 and terminals 33 are formed on the first substrate 4a at the same time as forming the line wiring 22 and dot electrodes 17a on the first substrate 4a. Note that the line wiring 22 extends into the extending portion 7 as it is to become the wiring 32. Spherical or cylindrical conductors 34 are mixed in the interior of the seal member 6 for adhering the fist substrate 4a with the second substrate 4b. The line electrodes 17b formed on the second substrate 4b extend to the portion of the seal member 6 on the second substrate 4b, and then electroconductive connect with the wiring 32 on the first substrate 4a via the conductive material 34. Due to this configuration, the driving IC 9 mounted on the first substrate 4a can supply signals to both the line wiring 22 on the first substrate 4a and accordingly the dot electrodes 17a, and the line electrodes 17b on the second substrate 4b.

In FIG. 1, the illumination device 3 disposed facing the outer surface of the first substrate 4a making up the liquid crystal panel 2 has a light guide member 39 having a square plate shape from of transparent plastic for example, and a light source device 41 attached to the light guide member 39. In FIG. 2, a light reflective sheet 52 is mounted to the face of the light guide member 39 opposite to the liquid crystal panel 2 by adhesion or the like, for example. Also, a light diffusion sheet 53 is mounted to the face of the light guide member 39 facing the liquid crystal panel 2 by adhesion for example, and further, a prism sheet 54 is mounted thereupon by adhesion, for example.

The light reflective sheet 52 reflects light which has been externally emitted from the face of the light guide member 39 opposite to the liquid crystal panel 2, so that the light passes through the light guide member 39 again, so as to be externally emitted from the face of the light guide member 39 facing the liquid crystal panel 2. The light diffusion sheet 53 diffuses the light emitted from the face of the light guide member 39 facing the liquid crystal panel 2, i.e., diffuses in multiple directions.

The prism sheet 54 is a sheet member having prisms, i.e., transparent members having two or more non-parallel faces, on the face thereof facing the liquid crystal panel 2 and/or on the face thereof facing the light guide member 39, and acts to direct the light emitted from the light diffusing sheet 53 in a predetermined direction.

In FIG. 1, the light source device 41 has three LEDs 42 serving as light sources for generating light in the point-shaped, and a board 43 for supporting the LEDs 42. The number of the LEDs 42 may be just one, or a multiple number other than three, if desired. The board 43 comprises, on a flexible semitransparent plastic film, terminals 44, wiring 46 extending from the terminals 44, and control circuits 47 connected to the wiring 46. The control circuits 47 generate a current for driving the LEDs 42. The LEDs 42 are fixed on the board 43 so as to be connected to the control circuits 47, by adhesion or the like.

As shown in FIG. 2 for example, the LEDs 42 have a blue LED 48 for generating blue light, and resin 49 which contains a YAG fluorescent substance provided on the light-emitting surface of the blue LED 48. Upon the blue light emitted from the blue LED 48 passing through the resin 49, part of the blue light interacts with the YAG fluorescent substance and is converted into yellow light, i.e., a mixed light of green light and red light, and mixes with the blue light which has been externally emitted without interacting with the YAG fluorescent substance, thereby yielding white color light at the light-emitting surface 51.

An attachment tab K is set on the tip of the board 43 of the light source device 41, with the attachment tab K being fixed to the face of the light guide member 39 opposite to the liquid crystal panel 2 with the light reflective sheet 52 introduced therebetween, by adhesion, for example. An arrangement may be used wherein, instead of such an adhesion method, protrusions such as pins for example are formed on suitable positions on the light guide member 39, and fitting structures such as holes for example are formed on the corresponding positions of the board 43, so that the pins and holes can be fit to fix the light source device 41 onto the light guide member 39.

Note that while a light reflective sheet 52 is provided between the light guide member 39 and the board 43 in the present embodiment, an arrangement may be made wherein the board 43 is directly fixed to the light guide member 39, and the light reflective sheet 52 is later mounted on the outer surface of the board 43 and light guide member 39.

Figure 4:
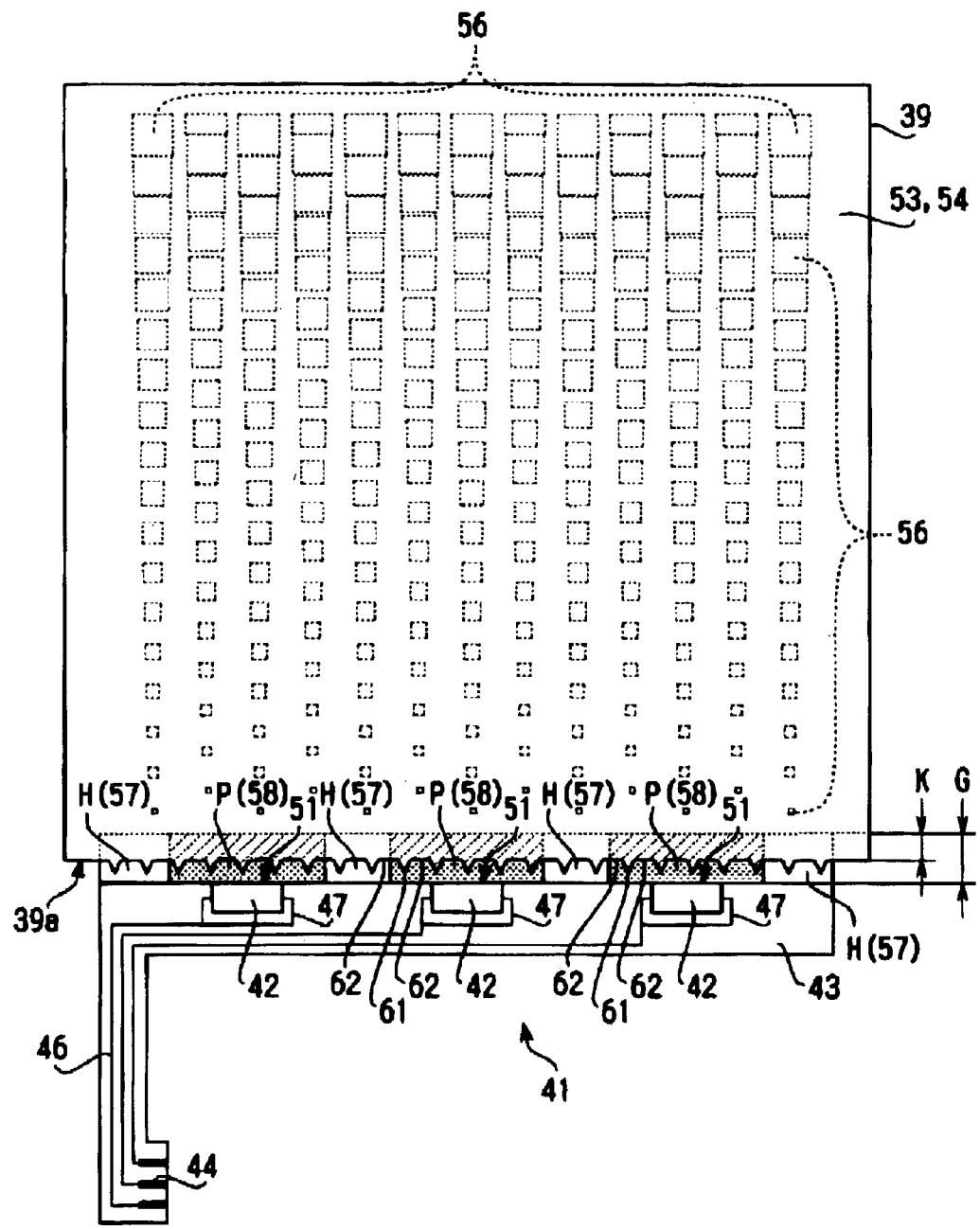
FIG. 4 is a plan view illustrating the planar configuration of the illumination device used with the liquid crystal device shown in FIG. 1.

Multiple protrusions 56 serving as a dot pattern are formed on the face of the light guide member 39 opposite to the liquid crystal panel 2, in a constant array pattern. The protrusions 56 are provided for guiding the light, which proceeds while conducting total reflection inside the light guide member 39, out of the light guide member 39. FIG. 4 illustrates a configuration of the light guide member 39 and the light source device 41 shown in FIG. 2 without the liquid crystal panel 2, viewed from the direction of the arrow B. As shown in FIG. 4, each of the protrusions 56 are formed square in planar fashion, and further are formed so as to be small in area closer to the light source device 41, and larger in area farther from the light source device 41.

The reason that the area of the protrusions 56 is changed according to the distance from the light source device 41 is in order to weaken the light quantity emitted toward the liquid crystal panel 2 near the light source device 41 and to strengthen the light quantity emitted toward the liquid crystal panel 2 far from the light source device 41, thereby making the planar light supplied from the light guide member 39 to be uniform.

Note that in FIG. 2, any or all of the light reflective sheet 52, light diffusing sheet 53, and prism sheet 54, may be omitted as desired.

Figure 11:
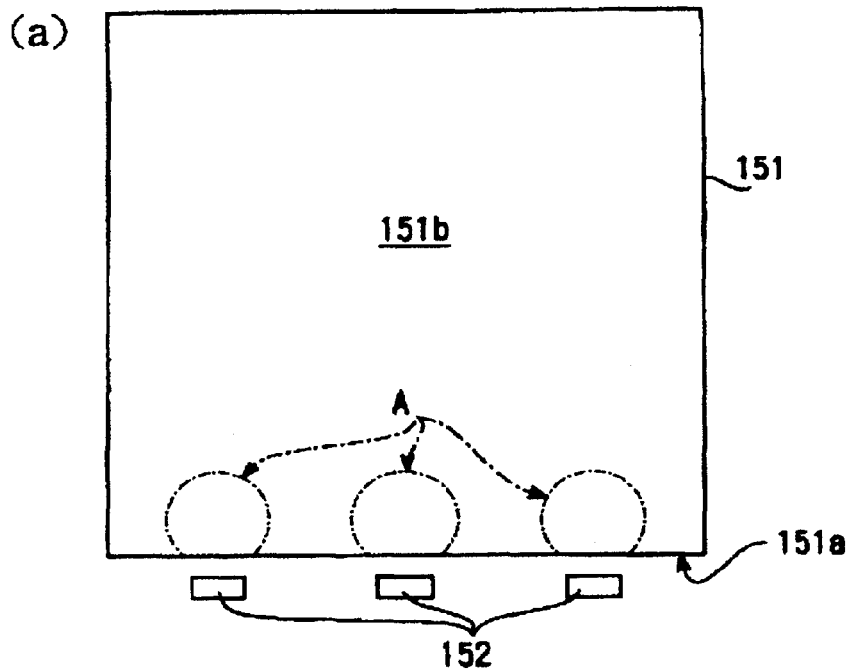
FIGS. 11(a) and (b) are plan views illustrating a conventional example of an illumination device.
Figure 11:
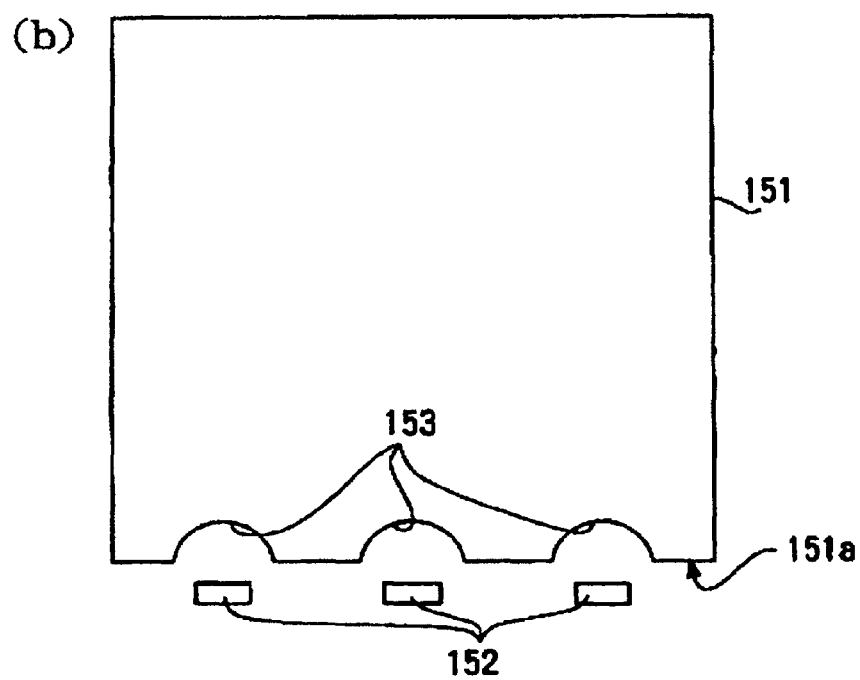
Figure 12:
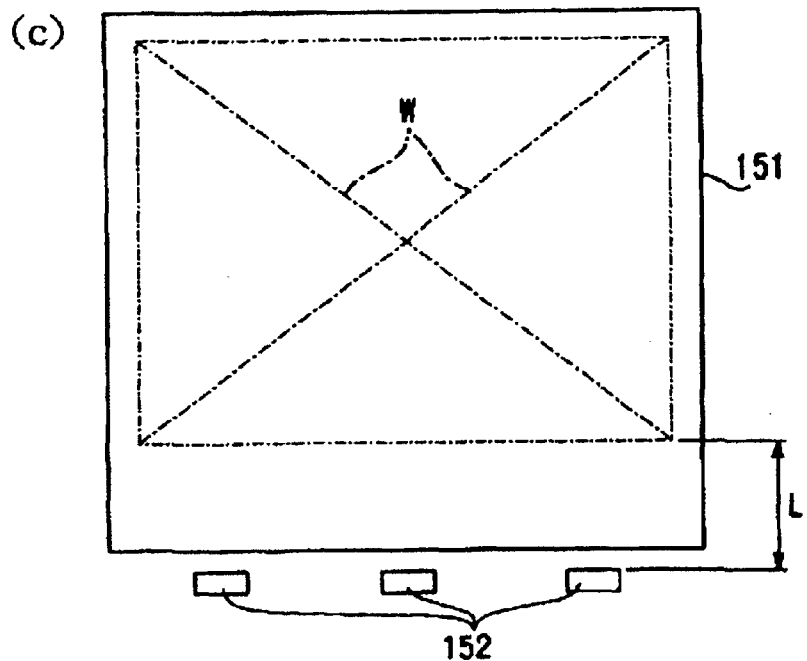
FIGS. 12(c) and (d) are plan views illustrating another conventional example of an illumination device.
Figure 12:
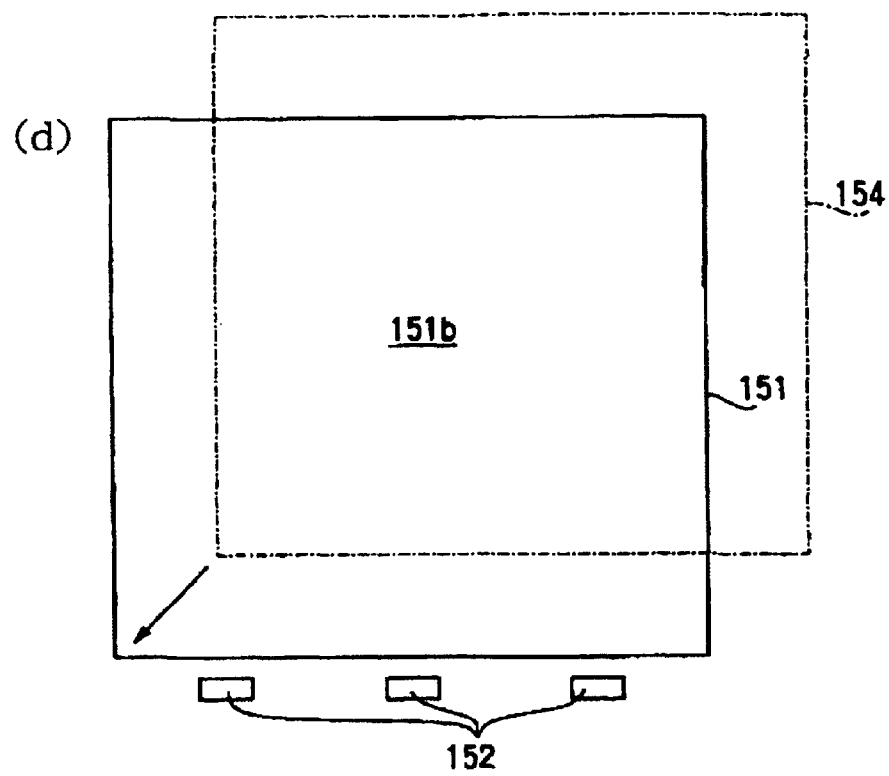

In FIG. 4, light reflective areas H are provided on the surface of the board 43 making up the light source device 41 at areas G closer to the light guide member 39 than the position where the LEDs 42 are provided, between adjacent LEDs 42. Also, optical areas P for suppressing the luminance of locally-high-luminance areas A (see FIG. 11($a$)) are provided at the front areas of the light-emitting faces 51 of the LEDs 42 between the light reflective areas H, i.e., near the light-emitting faces 51.

With the present embodiment, the light reflective areas H are formed of a white color material 57 printed on the board 43, as shown in FIG. 2. Also, optical areas P are formed of black color material 58 formed upon the white color material 57. The black color material 58 acts as a member which does not readily reflect light. The optical areas P and the light reflective areas H are provided both in the areas between the light input face 39$a$ of the light guide member 39 and the light-emitting faces 51 of the LEDs 42, and in the area where the board 43 overlaps the light guide member 39.

The light reflective areas H are not restricted to printing a white color material, and can be realized by forming the board 43 itself of a white color material or applying a white color sheet to the board. Also, the color is not restricted to white, and another color capable of reflecting light may be used.

Also, the material which does not readily reflect light, which makes up the optical area P is not restricted to printing a black color material, and can be realized by forming the board 43 itself of a black color material or applying a black color sheet to the board. Also, the color is not restricted to black, and another color capable of absorbing light, such as gray for example, may be used.

Figure 5:
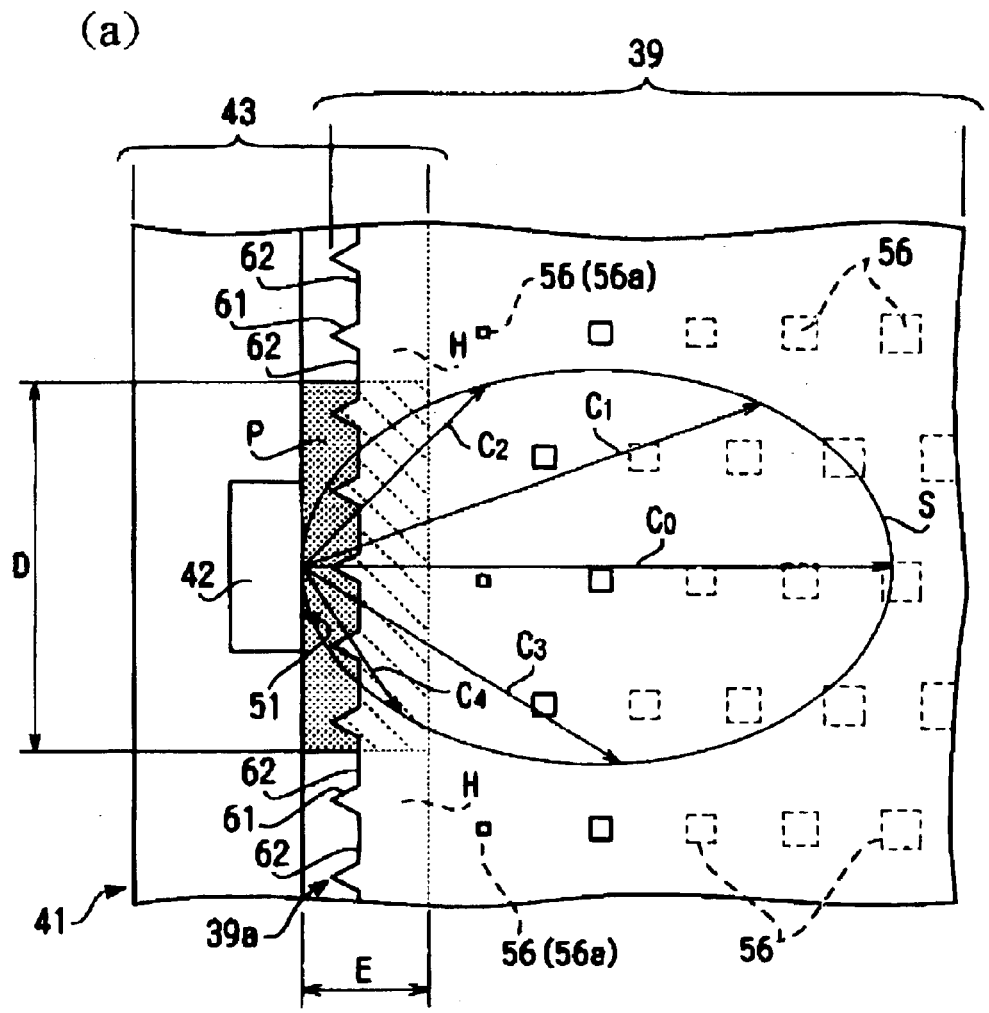
FIG. 5(a) is a enlarged plan view illustrating the primary components in FIG. 4.
FIG. 5(b) is a cross-sectional diagram illustrating the cross-sectional structure of the primary components.
Figure 5:
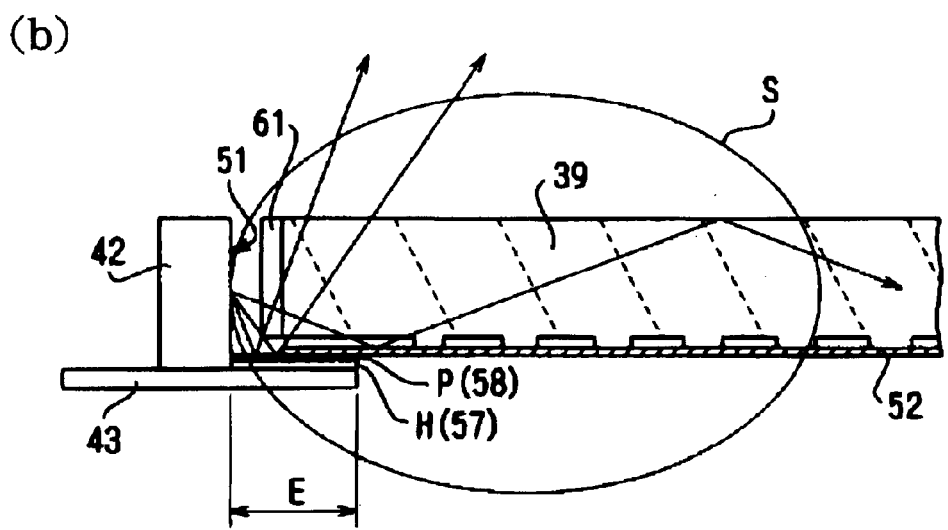

FIG. 5 illustrates an enlarged view of the portion of the structure with the board 43 and light guide member 39 which make up the light source device 41 being assembled, where the LEDs 42 are provided. Generally, LEDs 42 have directivity with regard to emitted light. That is to say, the light emitted from the light-emitting face 51 of the LED 42 is strong in particular directions, and weak in particular directions. The shape denoted by the reference symbol S in FIG. 5 indicates the light directivity of the LED 42.

Describing how to view the light directivity diagram S, in FIG. 5($a$), the intensity of light emitted from the LED 42 which progresses in the straight direction of progression indicated by the arrow C0 has an intensity indicated by the length of the arrow C0, and the intensity of the light progressing in the directions of the arrows C1, C2, C3, and C4, respectively have intensities corresponding to the length of the arrows. As can be clearly understood from this directivity diagram S, no light is emitted in the direction immediately beside the light emitting face of the LED 42, i.e., in the direction completely adjacent the angle 0°. Note that the light directivity of the LED 42 is not planar, but rather occurs in the height-wise direction as well, as shown in FIG. 5(b). That is to say, the LED 42 has light directivity indicated by a three-dimensional light directivity diagram S.

With the present embodiment, the planar width D of the optical areas P for suppressing the occurrence of locally-high-luminance areas is formed so as to be a range wider than the above light directivity diagram S. Thus, reflection of light from the LED 42 off of the board 43 can be suppressed in a reliable manner, and consequently, the occurrence of locally-high-luminance areas due to the reflected light can be suppressed in a reliable manner.

While the planar width D of the optical areas P is determined as described above, the planar length E of the optical areas P is determined regardless of the light directivity diagram S, as shown in FIG. 5(b). Specifically, the length E of the optical areas P is set so as to be longer than the area where the light emitted from the light-emitting face 51 of the LED 42 passes between the light guide member 39 and the LED 42 and directly reaches the board 43. Thus, reflected light from the board 43 which is reflected light at portions contributing to the occurrence of locally-high-luminance areas can be suppressed in a reliable manner.

Now, in the event of employing a structure wherein the light reflective sheet 52 is introduced between the board 43 and light guide member 39 as with the present embodiment, the light which has been emitted from the LEDs 42 and enters the light guide member 39 is reflected at the light reflective sheet 52 and does not reach the optical areas P. Accordingly, there may be no difference in the effects of suppressing the occurrence of locally-high-luminance areas between arrangements provided with the optical areas P and those not provided therewith, as far as the areas overlapping the light reflective sheet 52 are concerned. However, there may be cases wherein there is light which is transmitted through the light reflective sheet 52, so if possible, the optical areas P are preferably provided on the board 43 at the areas overlapping the light reflective sheet 52 as well, in order to prevent such light from reflecting at the board 43 and contributing to the occurrence of locally-high-luminance areas.

Also, as a modification of the liquid crystal device, an arrangement may be provided wherein the light reflective sheet 52 is not introduced between the board 43 and light guide member 39 as with the present embodiment, but rather wherein the board 43 is directly mounted to the sides of the light guide member 39, and the light reflective sheet 52 is later mounted to the outer surface of the board 43 and light guide member 39. In such cases, the light cast from the LEDs 42 into the light guide member 39 may not be totally reflected at the interface between the light guide member 39 and the external space but rather cast out of the light guide member 39, i.e., into the space, at the side portions of the light guide member 39 near the LEDs 42. In such cases, in the event that the light externally emitted from the light guide member 39 reaches the board 43, the light may reflect at the board 43 and contribute to the occurrence of locally-high-luminance areas, so optical areas P are preferably provided on areas of the board 43 where such reflected light might be anticipated.

Next, as a modification of the liquid crystal device, an arrangement may be conceived wherein no light reflective sheet 52 is used, but rather wherein the board 43 is directly mounted to the sides of the light guide member 39. In this case as well, the light cast from the LEDs 42 into the light guide member 39 may not be totally reflected at the interface between the light guide member 39 and the external space but rather cast out of the light guide member 39, i.e., into the space, at the side portions of the light guide member 39 near the LEDs 42. In such cases as well, in the event that the light externally emitted from the light guide member 39 reaches the board 43, the light may reflect at the board 43 and contribute to the occurrence of locally-high-luminance areas, so optical areas P are preferably provided on areas of the board 43 where such reflected light might be anticipated.

As described above, the occurrence of locally-high-luminance areas can be suppressed by providing optical areas P near the LEDs 42 on the board 43. With the present embodiment, light reflecting areas H of white color areas or the like are further provided between pairs of adjacent optical areas P. Generally, light readily reaches areas in front of the light-emitting faces of the LEDs 42, but light does not readily reach areas between pairs of adjacent LEDs 42, i.e., portions at the sides of the LEDs 42. This is thought to be one reason why locally-high-luminance areas readily occur corresponding to areas in front of the LEDs 42. With regard to this, providing light reflecting areas H in intermediate areas between pairs of adjacent LEDs as with the present embodiment allows the quantity of reflected light on the board 43 to be increased in areas where the light quantity tends to decrease, and consequently, the occurrence of locally-high-luminance areas can be suppressed in an even more reliable manner.

Next, as shown in FIG. 1 and FIG. 4, an optical pattern of continuous alternating prism faces 61 and flat faces 62 is formed on the light input face 39a of the light guide member 39. A prism is a transparent member having two or more non-parallel faces, with prism faces being the outer faces of such prisms. With the present embodiment, cross-sectional triangular protrusions linearly extending over the entire area of the height direction of the light input face 39a of the light guide member 39, i.e., the thickness direction thereof, are provided as prism faces 61.

Note that prism faces 61 are not restricted to being provided over the entire area of the height direction of the light input face 39a, i.e., the thickness direction of the light guide member 39, and may rather be provided at partial portions in the height direction thereof. Also, the cross-sectional triangular shape of the prism faces 61 may be equilateral triangles with the light input face 39a as the base thereof, triangles higher than equilateral triangles, i.e., isosceles triangles which are more acute than equilateral triangles, triangles lower than equilateral triangles, i.e., isosceles triangles which are more flattened than equilateral triangles, right triangles, or other arbitrary triangles. Also, the cross-sectional shape of the prism face 61 may be a polygonal form instead of a triangle.

As described above, prism faces 61 are provided to the light input face 39a of the light guide member 39, so light emitted from the LEDs 42 and entering the light guide member 39 is suitably diffused in the plane direction of the light guide member 39 by the prism faces 61, and accordingly, in conjunction with the existence of the optical areas P provided on the board 43, the occurrence of locally-high-luminance areas near the LEDs 42 can be suppressed in an even more reliable manner.

In providing the prism faces 61 to the light input face 39a of the light guide member 39, an arrangement wherein only prism faces 61 are continuously provided, i.e., wherein the entire face of the light input face 39*a* includes continuous prism faces 61, may be conceived. However, the present embodiment does not employ such continuous prism faces 61, but rather employs an optical pattern wherein prism faces 61 and flat faces 62 are alternately provided.

Experiments performed by the present inventor have confirmed that the occurrence of locally-high-luminance areas can be suppressed in an even more reliable manner by an arrangement wherein flat faces 62 are introduced between the prism faces 61 as compared with an arrangement wherein prism faces 61 are continuous. It is thought that this is because the diffusion state of light can be made even more marked with the arrangement wherein flat faces 62 are introduced between the prism faces 61 as compared with the arrangement wherein prism faces 61 are continuous.

Also, the luminance might decrease with an arrangement wherein the prism faces 61 are continuous without flat faces 62 introduced therebetween, but a continuation of prism faces 61 and flat faces 62 prevents decrease of luminance and enables a bright display to be made.

Note that the length of the base of the cross-sectional triangle making up the prism face 61 is formed longer than the width of the protrusion 56*a* closest to the prism face 61 thereof, as shown in FIG. 5(*a*). In other words, in the event of forming multiple protrusions 56 for adjusting the refraction of light on the face of the light guide member 39 opposite to the liquid crystal panel 2, the width of a protrusion 56*a* closest to the prism face 61 of these protrusions 56 is formed so as to be smaller than the base portion of the prism face 61.

The following is a description of the operations of the liquid crystal device configured as described above.

In the event that external light such as sunlight, room light, etc., is sufficient, the external light is taken into the liquid crystal panel 2 through the second substrate 4*b* as shown by the arrow F in FIG. 2, and the external light passes through the liquid crystal layer 13 and then is reflected at the transflector film 16 and supplied to the liquid crystal layer 13.

On the other hand, in the event that external light is insufficient, the LEDs 42 within the light source device 41 making up the illumination device 3 come on. At this time, the light that is emitted from the LEDs 42 as point-shaped light is guided into the light guide member 39 through the light input face 39*a* of the light guide member 39 as indicated by arrow J, and subsequently is directly emitted from the face thereof facing the liquid crystal panel 2, i.e., the light emitting face, or emitted from the opposite face where the protrusions 56 are provided and reflected off of the light reflective sheet 52 and then emitted from the light emitting face. Thus, light emitted from each portion of the light emitting face passes through the openings 19 formed in the transflector film 16 and supplied to the liquid crystal layer 13.

While light is being thus supplied to the liquid crystal layer 13, the liquid crystal panel 2 is being controlled by the driving IC 9, with scanning signals, for example being supplied to the line wiring 22 while, at the same time, data signals, for example, are supplied to the line electrodes 17*b*. At this time, upon the TFD 21 of a particular display dot being selected according to the potential difference between the scanning signal and data signal (i.e., being turned on), a picture signal is written to the liquid crystal capacity within the display dot, and subsequently, upon the TFD 21 being unselected (i.e., being turned off) the signal is stored in the display dot and drives the liquid crystal layer within the display dot.

Thus, the liquid crystal molecules within the liquid crystal layer 13 are controlled in increments of display dots, and accordingly, the light passing through the liquid crystal layer 13 is modulated in increments of display dots. The light thus modulated passes through the polarizing plate 27*b*, thereby displaying images such as characters, numerals, shapes, etc., in the effective display area of the liquid crystal panel 2.

As shown in FIG. 4, while display using the liquid crystal as described above is performed, the light which has been generated from the LEDs 42 is taken into the light guide member 39 through the light input face 39*a* of the light guide member 39. In the event that certain optical conditions are satisfied while this light progresses through the light guide member 39 while exhibiting total reflection, this light is emitted from the light guide member 39 in planar fashion and supplied to the liquid crystal panel 2.

At this time, the intensity of the light emitted from the LEDs 42 is strong at the front area of the light emitting faces 51 of the LEDs 42, and weak at the areas farthest in the crosswise direction from the LEDs 42. Accordingly, locally-high-luminance areas tend to occur at portions of the light guide member 39 near the LEDs 42. However, with the present embodiment, an optical pattern wherein prism faces 61 and flat faces 62 are alternately formed is provided at the light input face 39*a* of the light guide member 39, so light cast into the light input face 39*a* is sufficiently diffused in the plane direction of the light guide member 39. Accordingly, the occurrence of locally-high-luminance areas in the light guide member 39 near the LEDs 42 can be prevented in a reliable manner. Also, deterioration in luminance can also be prevented.

Also, with the present embodiment, black color optical areas P are provided at the front areas of the light-emitting faces 51 of the LEDs 42, so the quantity of light corresponding to the front areas of the light-emitting faces 51 of the LEDs 42 can be suppressed. Accordingly, the occurrence of locally-high-luminance areas as described above can be suppressed even further, due to the interactive effects with the optical pattern containing the prism faces 61.

Further, with the present embodiment, white color light reflective areas H are provided departing in the crosswise direction from the LEDs 42, i.e., at the side areas of the LEDs 42, so a decrease of light quantity at the areas in the crosswise direction from the LEDs 42 can be suppressed. Accordingly, the occurrence of locally-high-luminance areas as described above can be suppressed even further, due to the interactive effects with providing the optical pattern containing the prism faces 61 and black color optical areas P.

Modifications

Figure 6:
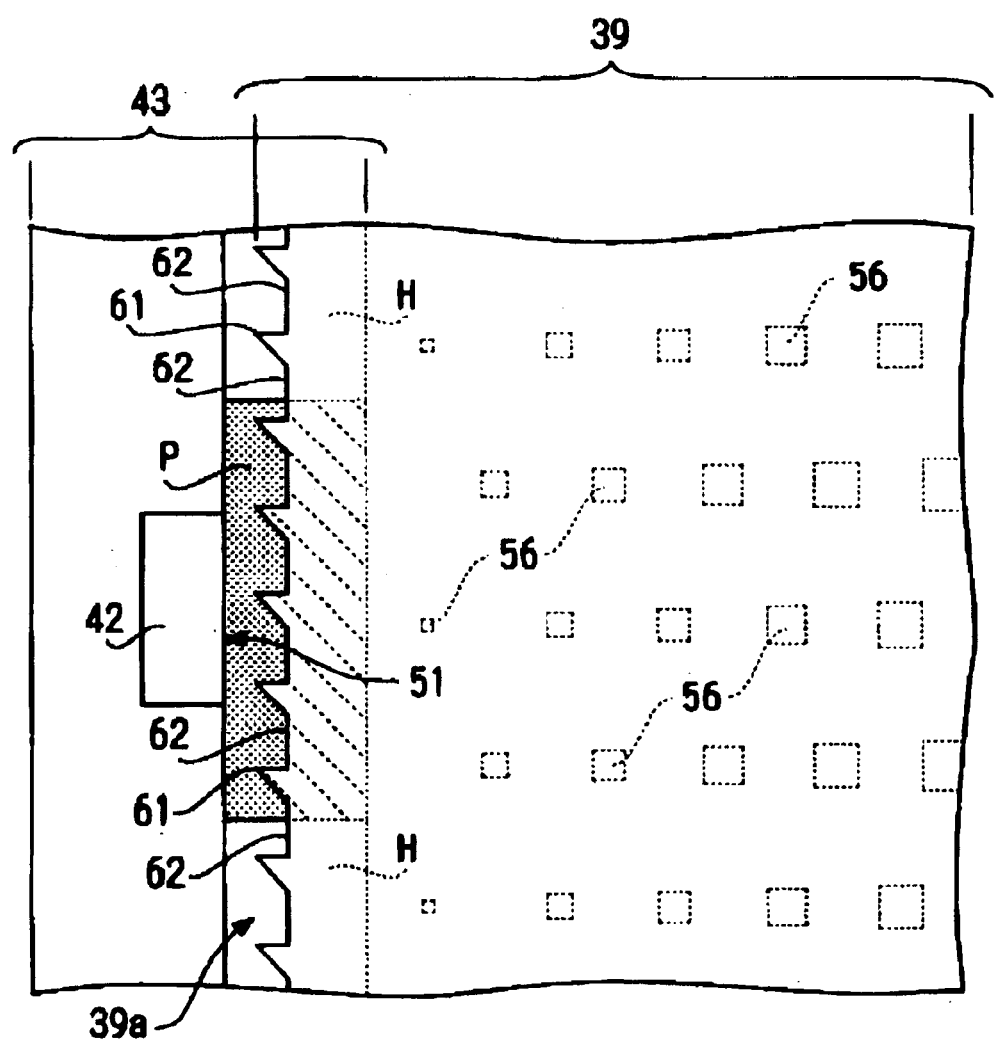
FIG. 6 is a plan view illustrating a modification of the prism faces to be provided to the light input face of the light guide member.

FIG. 6 illustrates a modification of the prism faces to be provided to the light input face 39*a* of the light guide member 39. While protrusions having cross-sectional forms of an equilateral triangle or isosceles triangle are used as the prism faces 61 in FIG. 5(*a*), the example shown in FIG. 6 uses protrusions having cross-sectional forms of a right triangle as the prism faces 61.

Figure 7:
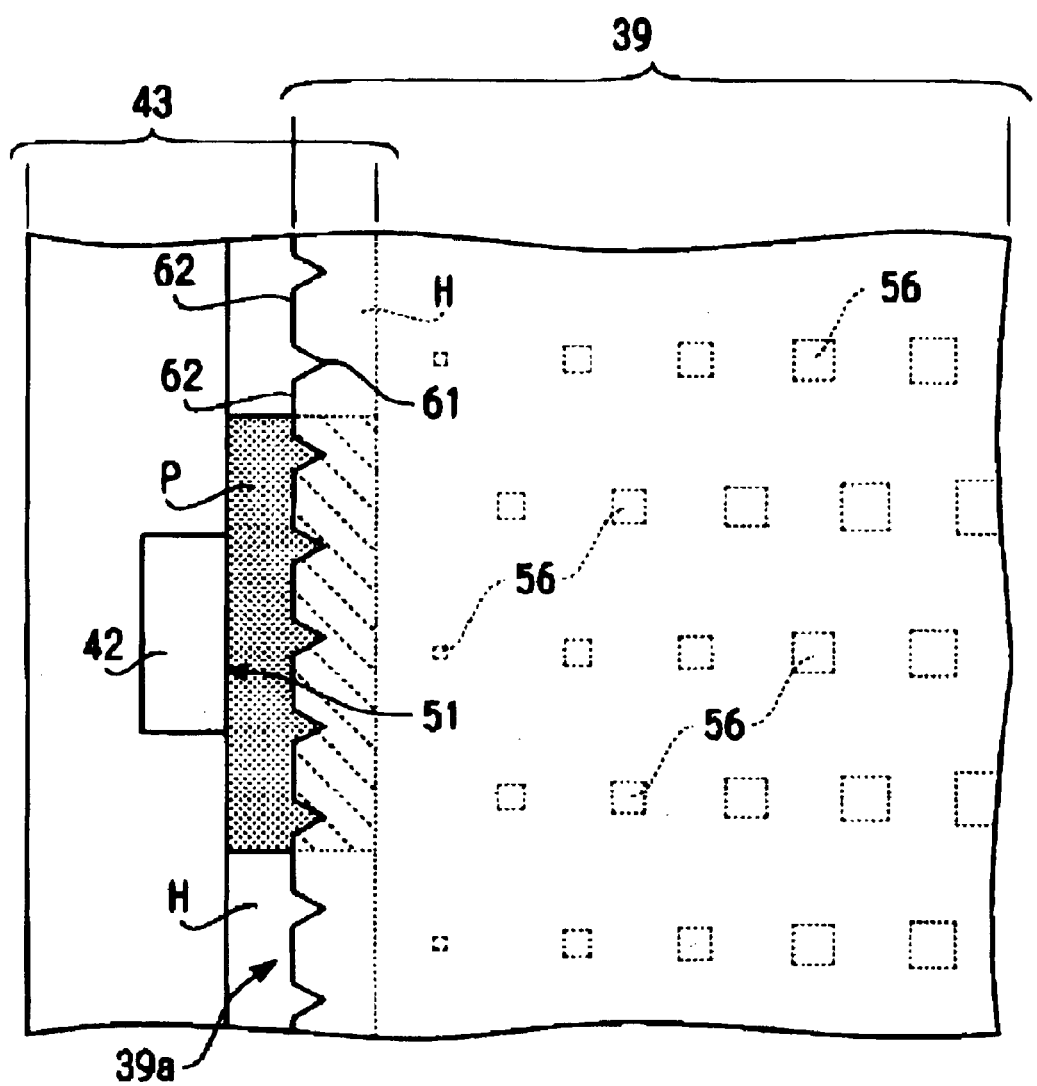
FIG. 7 is a plan view illustrating another modification of the prism faces to be provided to the light input face of the light guide member.

FIG. 7 illustrates another modification of the prism faces to be provided to the light input face 39*a* of the light guide member 39. While protrusions are used for the prism faces 61 in FIG. 5(*a*) and FIG. 6, the example shown in FIG. 7 uses recesses as the prism faces 61, and particularly recesses having cross-sectional forms of an equilateral triangle or isosceles triangle.

Figure 8:
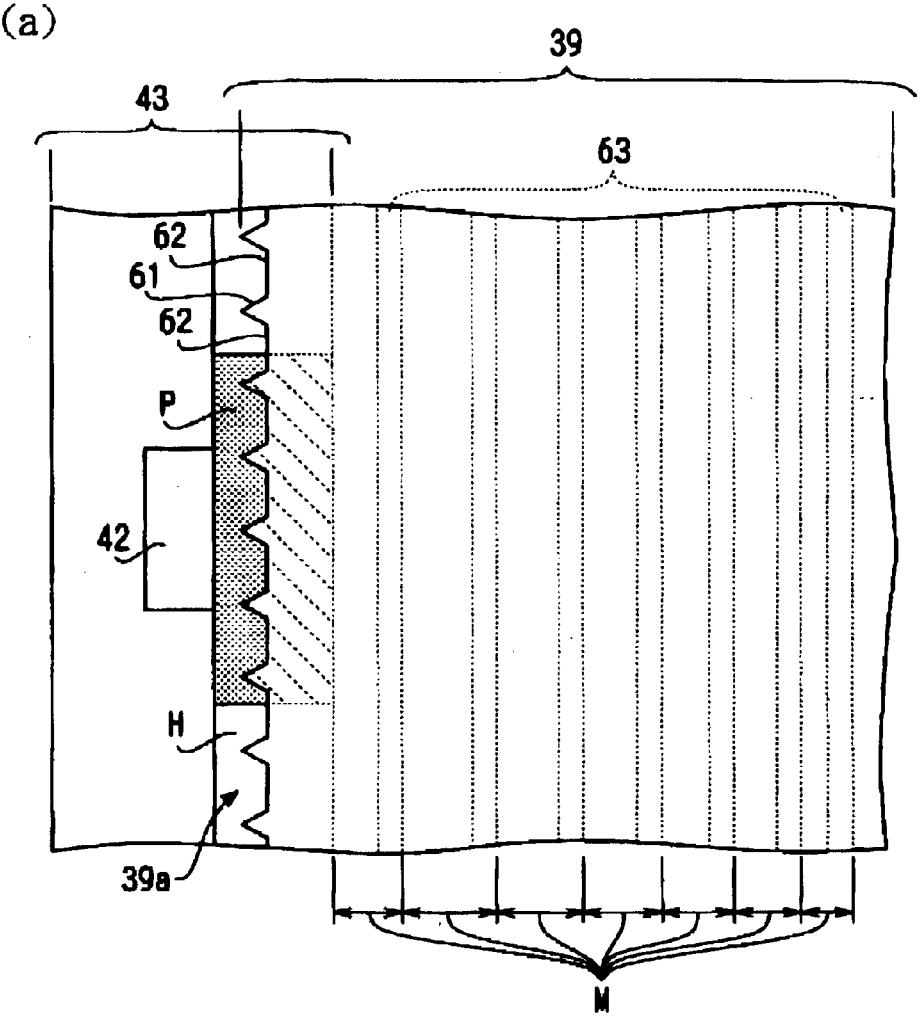
FIG. 8(a) is a plan view illustrating a modification of optical patterns to be provided on the light emitting face and so forth of the light guide member.
FIG. 8(b) is a cross-sectional diagram thereof.
Figure 8:
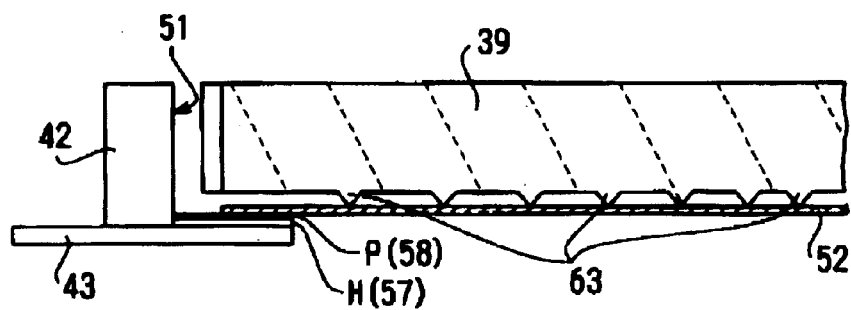

FIG. 8 indicates a modification of the optical pattern for adjusting the refractive index of light, provided on the planar light emitting face of the light guide member 39 and on the face on the opposite side thereof. With the embodiment shown in FIG. 5, dot-like protrusions 56 are used for such an optical pattern, but the example shown in FIG. 8 uses multiple linear protrusions 63 extending in the crosswise direction as to the incident direction of light from the LED 42, i.e., stripe patterns, as an optical pattern. In FIG. 8, the cross-sectional form of the stripe patterns 63 is triangular, but this may be made to be square, half-circle, etc.

Due to the same reason for gradually increasing the area of the dot-shaped protrusions 56 while moving away from the LEDs 42 in FIG. 5, i.e., in order to emit planar light with a uniform intensity from the light emitting face of the light guide member 39, the array pitch M of the multiple stripe protrusions is formed so as to become gradually narrower. Alternatively, a configuration may be employed wherein the size of the stripe protrusions 63 becomes gradually larger, instead.

Further, with the embodiment shown in FIG. 5, printing a black color material or the like is performed for the material which does not readily reflect light, in order to form the optical areas P for preventing the occurrence of locally-high-luminance areas. That is, a light-absorbing material is used for the material which does not readily reflect light. However, material which does not readily reflect light is not restricted to such a light-absorbing material, and rather may be formed of a light diffusing member or light transmitting member.

Embodiment of the Electronic Apparatus

Figure 9:
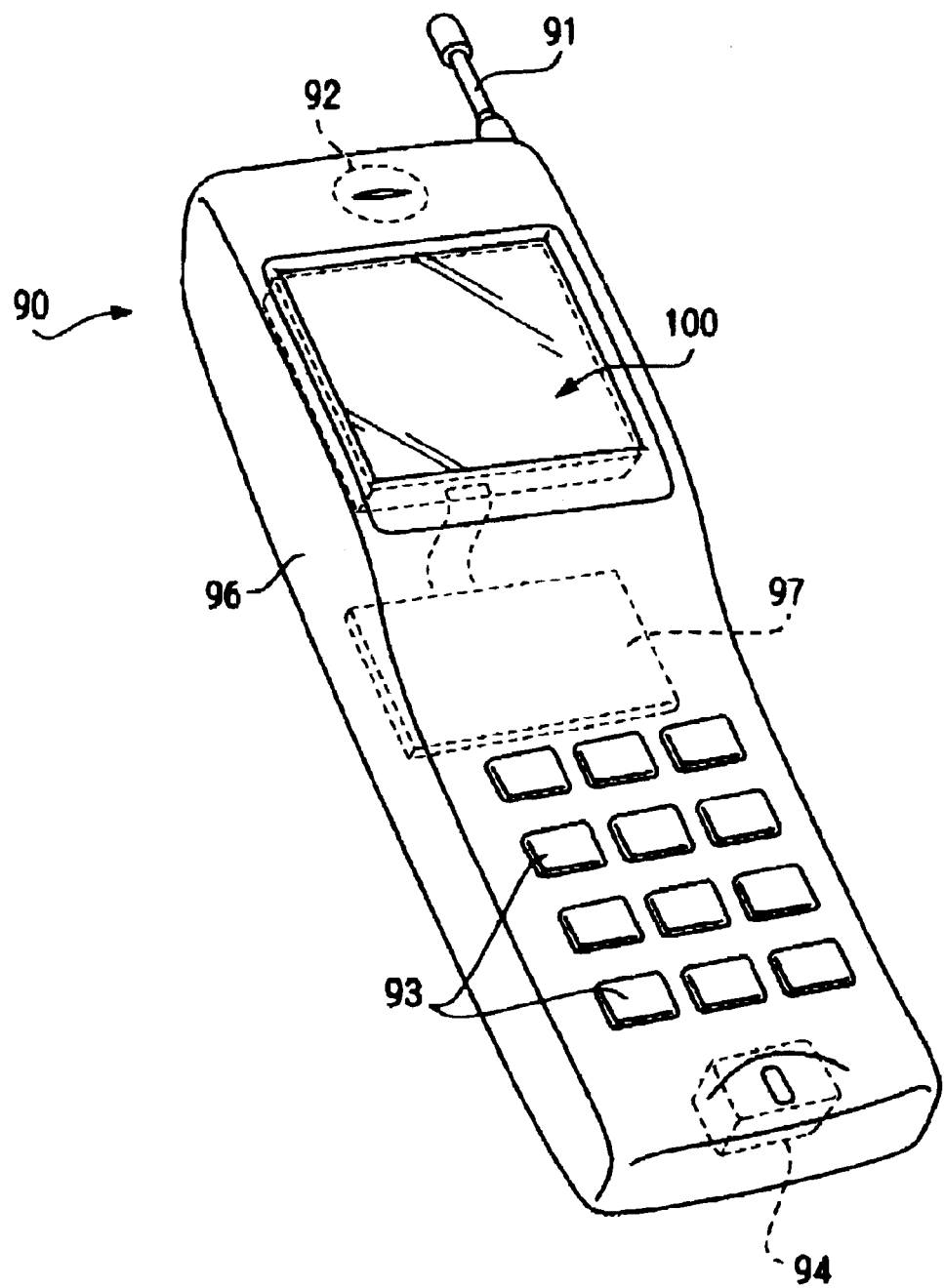
FIG. 9 is a perspective view illustrating an embodiment of the electronic apparatus according to the present invention.

FIG. 9 illustrates an embodiment of a cellular phone which is an example of the electronic apparatus according to the present invention. The cellular phone 90 is configured of components such as an antenna 91, speaker 92, liquid crystal device 100, key switches 93, and microphone 94, stored in an outer case 96 serving as a housing. Also, a control circuit board 97 mounting a control circuit for controlling the operations of the aforementioned components is provided within the outer case 96. The liquid crystal device 100 can be configured with the liquid crystal device 1 shown in FIG. 1, for example.

With the cellular phone 90, signals input from the key switches 93 and microphone 94, and reception data and the like received by the antenna 91, are input to the control circuit on the control circuit board 97. The control circuit displays images such as numerals, characters, pictures, etc., on the display face of the liquid crystal device 1 based on the various types of data that are input, and further transmits transmission data through the antenna 91.

With the liquid crystal device 1 shown in FIG. 1, the optical pattern formed of prism faces 61 and flat faces 62 has been provided to the light input face 39a of the light guide member 39, so the occurrence of locally-high-luminance areas in the effective display area of the liquid crystal panel 2 near the LEDs 42 can be prevented, and a uniform display can be made. Accordingly, using such a liquid crystal device 1 for the liquid crystal device 100 shown in FIG. 9 allows a readily-viewable display with uniform brightness to be made on the display unit of the cellular phone 90.

Figure 10:
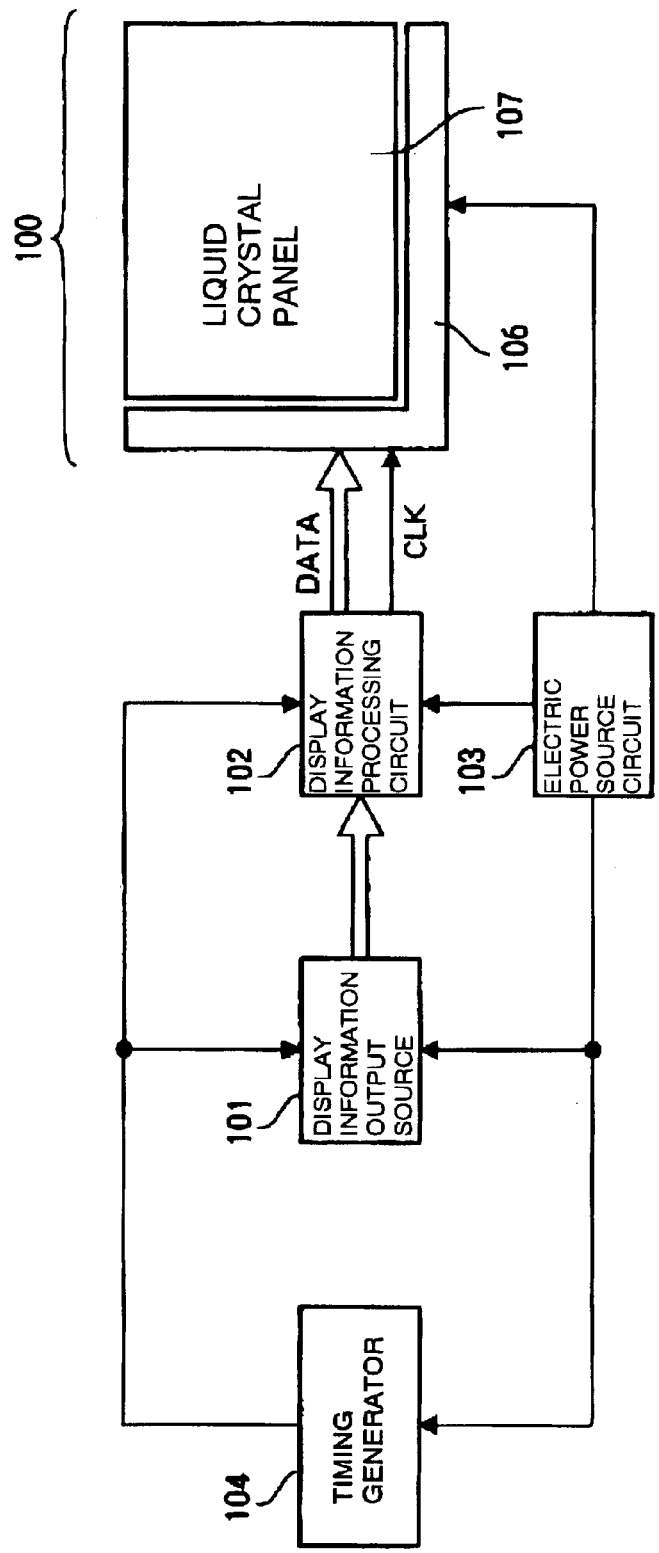
FIG. 10 is a block diagram illustrating another embodiment of the electronic apparatus according to the present invention.

FIG. 10 illustrates another embodiment of the electronic apparatus according to the present invention. The electronic apparatus shown here is configured of a display information output source 101, a display information processing circuit 102, an electric power source circuit 103, a timing generator 104, and a liquid crystal device 100. The liquid crystal device 100 has a liquid crystal panel 107 and a driving circuit 106.

The display information output source 101 comprises memory such as RAM (Random Access Memory) or the like, a storage unit such as a disk of some sort or the like, and a synchronizing circuit or the like for synchronous output of digital image signals, and supplies display information of image signals following a predetermined format of the like to the display information processing circuit 102, based on clock signals of some sort generated by the timing generator 104.

Next, the display information processing circuit 102 has a great number of known circuits such as amplifier and inversion circuits, rotation circuits, gamma correction circuits, clamping circuits, and so forth, subjects the input display information to processing, and supplies image signals to the driving circuit 106 along with clock signals CLK. Here, the driving circuit 106 is a collective reference to not only the scanning line driving circuit (not shown) and data line driving circuit (not shown), but also inspection circuits and the like, as well. Also, the electric power source circuit 103 supplies predetermined electric power source voltage to the aforementioned components.

In the electronic apparatus according to the present embodiment, a uniformly bright display with no locally-high-luminance areas can be made by using the liquid crystal device 1 shown in FIG. 1 as the liquid crystal device 100.

Other Embodiments

While the present invention has been described with reference to preferred embodiments, the present invention is not restricted to the embodiments, and various modifications may be made within the range of the invention described in the Claims.

For example, the present invention has been applied to a liquid crystal device with COG (Chip On Glass) structure, the driving ICs are directly mounted on the surface on the board, but it is needless to say that the present invention can be applied to liquid crystal devices having a structure wherein the driving IC is connected to the liquid crystal panel by a wiring board such as an FPC (Flexible Printed Circuit) or the like. Also, the present invention can be applied to liquid crystal devices having a structure wherein a TAB (Tape Automated Bonding) board to which the driving IC has been mounted is connected to the liquid crystal panel.

Also, with the embodiment shown in FIG. 1, the present invention is applied to an active-matrix liquid crystal device having a configuration wherein TFDs which are two-terminal active devices are provided to each dot as switching devices, but the present invention can also be applied to simple (static) matrix liquid crystal devices which do not use active devices, active-matrix liquid crystal devices having a configuration of three-terminal active devices such as TFTs (Thin Film Transistor) being provided to each display dot as switching devices, instead.

Also, with the embodiment shown in FIG. 1, TN type liquid crystal material is generally used, but the present invention can also be applied to liquid crystal devices having a configuration of using BTN (Bi-stable Twisted Nematic) type liquid crystal material, liquid crystal devices having a configuration of using bi-stable type liquid crystal material having memory characteristics such as ferroelectric type liquid crystal material, liquid crystal devices having a configuration of using macromolecule-dispersion type liquid crystal material, liquid crystal devices having various configurations of using GH (guest-host) liquid crystal wherein a dye (guest) having anisotropy regarding the absorption of visible light in the major axis direction and the minor axis direction of the molecule is dissolved in liquid crystal (host) having a constant molecular array so that the dye molecules are arrayed in parallel with the liquid crystal molecules, and so forth, instead.

Also, the present invention can also be applied to liquid crystal devices using vertical alignment (i.e., homeotropic alignment) wherein the liquid crystal molecules are vertically aligned as to both substrates while no voltage is applied, and wherein the liquid crystal molecules are horizontally aligned as to both substrates while voltage is applied.

Also, the present invention can also be applied to liquid crystal devices using parallel alignment (i.e., horizontal alignment or homogeneous alignment) wherein the liquid crystal molecules are horizontally aligned as to both substrates while no voltage is applied, and wherein the liquid crystal molecules are vertically aligned as to both substrates while voltage is applied.

As described above, the present invention can be applied to liquid crystal devices with various types of liquid crystal and alignment methods.

Also, while the present embodiment has been applied to a cellular phone as an electronic apparatus in FIG. 9, the present invention can be applied to other various types of electronic apparatuses as well, such as portable information terminals, digital cameras, video camcorders, and so forth.

EMBODIMENTS

First Embodiment

Figure 13:
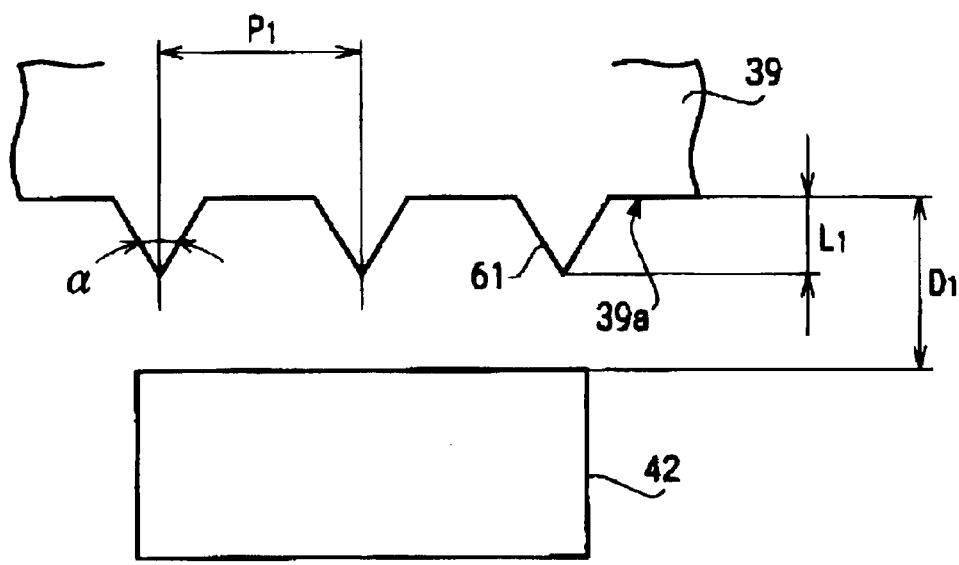
Figure 13:
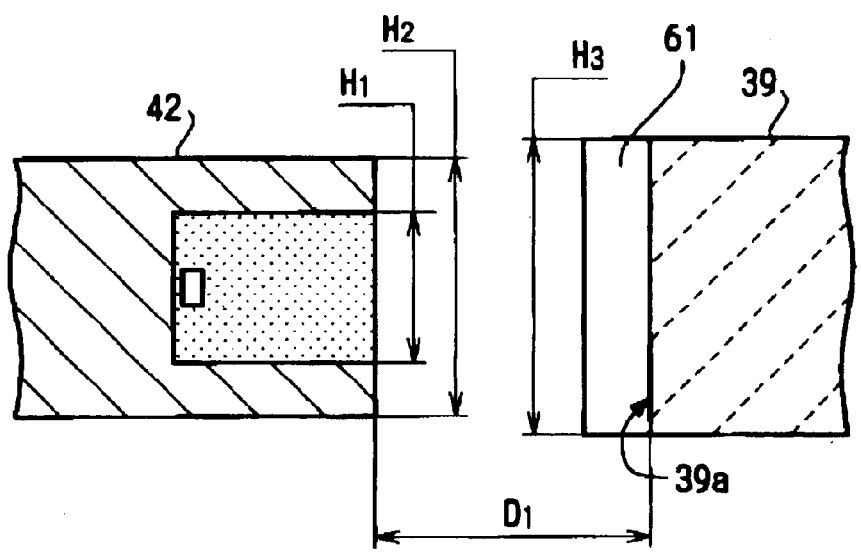

As shown in FIG. 13(a), the height of the prism face 61 was set at L1=10 to 50 μm, preferably 0.02 to 0.03 mm, the vertical angle to α=80 to 120°, the pitch to P1=100 to 300 μm, and the distance between the light-emitting face of the LED 42 and the light input face 39a of the light guide member 39 to D1=0.2 mm or less. Also, as shown in FIG. 13(b), the height of the light-emitting face of the LED 42 was set at H1=0.7 mm, the height of the LED 42 to H2=1.0 mm, and the height of the light input face 39a of the light guide member 39 to H3=0.8 to 0.9 mm. Setting the conditions for the LEDs 42 and prism faces 61 and so forth as described above, the locally-high-luminance areas were reduced to a level that poses no problems from a practical standpoint, and moreover, sufficient luminance of light emitted from the light guide member 39 was secured.

Second Embodiment

Figure 14:
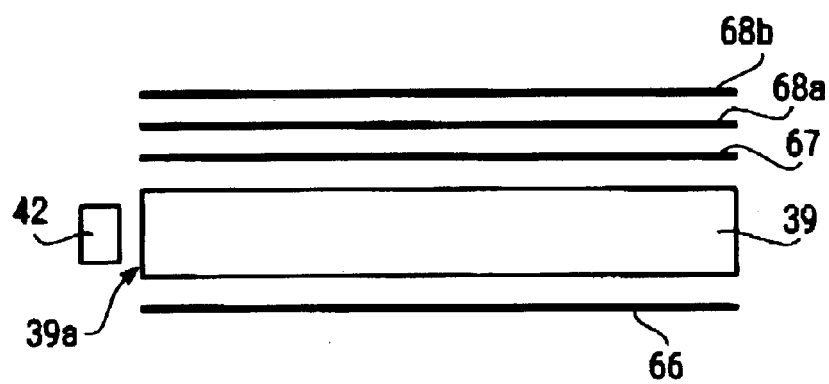
Figure 14:
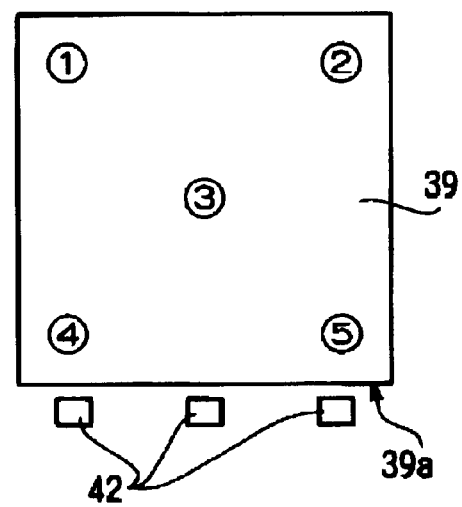

Next, in FIG. 14(a), for a light guide member 39, two inches in diagonal size, three types of light guide members 39 were prepared: an arrangement wherein the light input face 39a is a simple flat face, a product of the present invention wherein the light input face 39a is a continuation of prism faces and flat faces, and an arrangement wherein the light input face 39a is a continuation of prism faces alone.

Three LEDs 42 were positioned as light sources facing the light input face 39a of the light guide member 39. Also, a light reflective sheet 66 was provided on the rear face of the light guide members 39, and further, a light diffusing sheet 67, a first prism sheet 68a, and a second prism sheet 68b where provided to the light emitting side of the light guide members 39. The first prism sheet 68a and second prism sheet 68b were arranged so that the prism patterns thereof were mutually orthogonal.

Electric current of 15 mA was supplied to each LED 42 so as to light the illumination devices. Then, the luminance at the five points indicated by ① through ⑤ in FIG. 14(b) on the light emitting face of the light guide member 39 was measured using a luminance meter BM5A (manufactured by TOPCON CORPORATION).

FIG. 15 illustrates the measurement results thereof. In FIG. 15, "average luminance" means the average of the luminance measured at ① through ⑤. Also, "uniformity" is the average value of "luminance irregularities". The measurement results showed the following. That is, the locally high-luminance areas occurring near the LEDs 42 of the light guide member 39 was reduced to a level that poses no problems from a practical standpoint by the arrangement with the configuration wherein prism faces and flat faces are continuous. Also, luminance irregularities at the light emitting face of the light guide member 39 were reduced to a level that poses no problems from a practical standpoint by the arrangement with the configuration wherein prism faces and flat faces are continuous. Further, the average luminance at the light emitting face of the light guide member 39 was highest with the arrangement with the configuration wherein prism faces and flat faces are continuous. Thus, it has been shown that providing an optical pattern with continuous prism faces and flat faces for the light input face of the light guide member 39 yields emitted light with high luminance and no occurrence of locally-high-luminance areas.

The entire disclosure of Japanese Patent Application Nos. 2002-375561 filed Dec. 25, 2002 and 2002-059561 filed Mar. 5, 2002 are incorporated by reference.

What is claimed is:

1. An illumination device, comprising:
a light source for generating light; and
a light guide member wherein light from said light source is received at a light input face and emitted from a light emitting face,
wherein said light input face includes a continuous optical pattern of prism faces and flat faces,
a plurality of dot patterns for adjusting a refractive index of light are formed on the light emitting face of said light guide member or a reverse face of said light guide member, and
a width of the dot patterns formed closest to said light input face is smaller than a length of a base of said prism faces.

2. The illumination device according to claim 1, wherein said prism faces linearly extend in a thickness direction of said light guide member and wherein a cross-sectional form of said prism faces is at least one of triangular protrusions and triangular recesses.

3. The illumination device according to claim 1, wherein said prism faces linearly extend in a thickness direction of said light guide member and wherein a cross-sectional form of said prism faces is at least one of protrusions and recesses of a right triangle shape with said light input face as a base thereof.

4. The illumination device according to claim 1, wherein said prism faces linearly extend in a thickness direction of said light guide member and wherein a cross-sectional form of said prism faces is at least one of protrusions and recesses of an isosceles triangle shape which is more acute than an equilateral triangle.

5. The illumination device according to claim 2, wherein a width of said prism faces is generally equal over an entire area of said light guide member in the thickness direction.

6. The illumination device according to claim 1, wherein a height or depth of said prism faces is about 10 to 50 μm, a vertical angle of said prism faces is about 80 to 120°, and a pitch of said prisms is about 100 to 300 μm.

7. The illumination device according to claim 1, wherein a plurality of stripe patterns for adjusting a refractive index of light are formed on the light emitting face of said light guide member or a reverse face of said light guide member.

8. An illumination device, comprising:

a light source for generating light;

a board for supporting said light source; and a light guide member wherein light from said light source is received at a light input face of said light guide member and emitted from a light emitting face of said light guide member, wherein an optical area for suppressing a luminance of a locally high-luminance area occurring near said light source is provided on a face of said board supporting said light source, and wherein said light input face includes a continuous optical pattern of prism faces and flat faces.

9. The illumination device according to claim 8, wherein said optical area is formed by providing a material which does not readily reflect light on said board near the light-emitting face of said light source.

10. The illumination device according to claim 8, wherein said optical area is formed by providing a material which does not readily reflect light on an area of said board where light from said light source reaches.

11. The illumination device according to either claim 9, wherein said material which does not readily reflect light is provided over a wider range than an optical directivity range of said light source.

12. The illumination device according to claim 8, wherein a light reflective area is provided on the surface of said board where said light source is provided, in an area surrounding said optical area.

13. The illumination device according to claim 12, wherein said light reflective area is formed as a white color area.

14. The illumination device according to claim 9, wherein said material which does not readily reflect light comprises at least one of light absorbing material, light diffusing material, and light transmitting material.

15. The illumination device according to claim 9, wherein said material which does not readily reflect light comprises at least one of black and gray colored printing.

16. The illumination device according to claim 1, wherein said light source comprises a blue LED and a YAG fluorescent substance provided around said blue LED.

17. A liquid crystal device, comprising:

an illumination device which generates light in a planar manner; and a liquid crystal panel provided facing the light emitting face of said illumination device, wherein said illumination device comprises the illumination device according to claim 1.

18. An electronic apparatus, comprising:

a liquid crystal device comprising a liquid crystal layer;

a housing for storing said liquid crystal device; and a control means for controlling the operations of said liquid crystal device, wherein said liquid crystal device comprises the liquid crystal device according to claim 17.

19. The illumination device according to claim 3, wherein a width of said prism faces is generally equal over an entire area of said light guide member in the thickness direction.

20. The illumination device according to claim 4, wherein a width of said prism faces is generally equal over an entire area of said light guide member in the thickness direction.

21. The illumination device according to either claim 10, wherein said material which does not readily reflect light is provided over a wider range than an optical directivity range of said light source.

22. The illumination device according to claim 10, wherein said material which does not readily reflect light comprises at least one of light absorbing material, light diffusing material, and light transmitting material.

23. The illumination device according to claim 10, wherein said material which does not readily reflect light comprises at least one of black and gray colored printing.

24. An illumination device, comprising:

a light source for generating light; and a light guide member wherein light from said light source is received at a light input face and emitted from a light emitting face, wherein said light input face includes a continuous optical pattern of prism faces and flat faces, and wherein said light source comprises a blue LED and a YAG fluorescent substance provided around said blue LED.

* * * * *